United States Patent
Konishi et al.

(10) Patent No.: US 10,112,474 B2
(45) Date of Patent: Oct. 30, 2018

(54) DRIVING SYSTEM

(71) Applicant: HONDA MOTOR CO., LTD., Tokyo (JP)

(72) Inventors: Yoshiaki Konishi, Wako (JP); Yusuke Sakaguchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/562,061

(22) PCT Filed: Mar. 27, 2017

(86) PCT No.: PCT/JP2017/012465
§ 371 (c)(1),
(2) Date: Sep. 27, 2017

(87) PCT Pub. No.: WO2017/170442
PCT Pub. Date: Oct. 5, 2017

(65) Prior Publication Data
US 2018/0194216 A1 Jul. 12, 2018

(30) Foreign Application Priority Data
Mar. 30, 2016 (JP) .................. 2016-067853

(51) Int. Cl.
*B60K 6/44* (2007.10)
*B60K 6/52* (2007.10)
(Continued)

(52) U.S. Cl.
CPC ............ *B60K 6/44* (2013.01); *B60K 6/52* (2013.01); *B60K 17/356* (2013.01); *B60L 11/14* (2013.01);
(Continued)

(58) Field of Classification Search
CPC ......... B60K 6/44; B60K 17/356; B60K 6/52; B60K 17/046; B60K 2006/4825;
(Continued)

(56) References Cited

U.S. PATENT DOCUMENTS 7,040,433 B2 * 5/2006 Yamamoto ............... B60K 6/44
180/65.225
8,678,975 B2 * 3/2014 Koike ...................... B60K 6/48
477/186
(Continued)

FOREIGN PATENT DOCUMENTS

JP   2012-214176 A   11/2012
JP   2015-168399 A   9/2015
JP   6070831 B2      2/2017

OTHER PUBLICATIONS

Decision to Grant a Patent dated Feb. 28, 2017, Issued in counterpart Japanese Patent Application No. 2016-067853, w/English translation (5 pages).
(Continued)

Primary Examiner — Jacob B Meyer
(74) Attorney, Agent, or Firm — Westerman, Hattori, Daniels & Adrian, LLP

(57) ABSTRACT

A driving system includes: a motor; a power transmission device; a motor controller; an application force controller; and an application force acquiring device. When the motor controller receives a request for generation of power in such a state that the motor generates no power, the motor controller controls to permit and/or prohibit the generation of power of the motor based on the current application force and a necessary application force which is an application force of the power transmission device that is needed to transmit a maximum generation power of the motor in a
(Continued)

current rotating state quantity which is a rotating state quantity that the motor is currently having.

8 Claims, 22 Drawing Sheets

(51) Int. Cl.
| | |
|---|---|
| *B60K 17/356* | (2006.01) |
| *B60L 11/14* | (2006.01) |
| *B60L 15/20* | (2006.01) |
| *B60K 6/48* | (2007.10) |
| *B60W 10/02* | (2006.01) |
| *B60W 10/08* | (2006.01) |
| *B60W 20/14* | (2016.01) |
| *B60K 17/04* | (2006.01) |

(52) U.S. Cl.
CPC ........ *B60L 15/2009* (2013.01); *B60K 17/046* (2013.01); *B60K 2006/4825* (2013.01); *B60W 10/02* (2013.01); *B60W 10/08* (2013.01); *B60W 20/14* (2016.01)

(58) Field of Classification Search
CPC ..... B60L 15/2009; B60L 11/14; B60W 20/14; B60W 10/08; B60W 10/02
See application file for complete search history.

(56) References Cited

U.S. PATENT DOCUMENTS

| | | | |
|---|---|---|---|
| 9,376,006 B2 * | 6/2016 | Terayama | ................ B60K 6/52 |
| 2016/0039405 A1 * | 2/2016 | Terayama | .............. B60K 6/442 |
| | | | 701/22 |
| 2016/0318385 A1 * | 11/2016 | Terayama | ............. B60W 10/08 |

OTHER PUBLICATIONS

International Search Report dated Jun. 27, 2017, issued in counterpart application No. PCT/JP2017/012465. (8 pages).

* cited by examiner

| VEHICLE STATES | FRONT UNIT | REAR UNIT | REAR MOTOR | EOP | SOL | OWC | BRK |
|---|---|---|---|---|---|---|---|
| HALT | × | × | STOP | OFF | OFF | OFF | OFF |
| LOW VEHICLE SPEED FORWARD TRAVELING | × | ○ | POWER RUNNING DRIVE | Lo | OFF | ON | ON (WEAKLY APPLIED) |
| MIDDLE VEHICLE SPEED FORWARD TRAVELING | ○ | × | STOP | Lo | OFF | OFF | ON (WEAKLY APPLIED) |
| REGENERATIVE DECELERATION | ○ | ○ | REGENERATIVE DRIVE | Hi | OFF | OFF | ON |
| ACCELERATION | ○ | ○ | POWER RUNNING DRIVE | Lo | OFF | ON | ON (WEAKLY APPLIED) |
| HIGH VEHICLE SPEED FORWARD TRAVELING | ○ | × | STOP | Hi | ON | OFF | OFF |
| REVERSING | × | ○ | REVERSE POWER RUNNING DRIVE | Lo | OFF | OFF | ON |

FIG.15

DRIVING SYSTEM

TECHNICAL FIELD

The present invention relates to a driving system which includes a motor and a power transmission device for changing a power transmission capacity of a power transmission path between the motor and wheels.

BACKGROUND ART

Vehicle driving systems have conventionally been known which include a motor and a power transmission device for changing a power transmission capacity of a power transmission path between the motor and wheels. For example, in a vehicle driving system described in Patent Literature 1, it is described that the application force of a hydraulic brake is controlled according to the viscosity of oil in consideration of the fact that an application force that is required on a hydraulic brake as a power transmission device changes according to the viscosity of oil used.

It is also described that in regeneration, a vehicle is slowed through regenerative braking by applying strongly the hydraulic brake and driving a motor for regeneration and that kinetic energy obtained is converted to electrical energy to charge the battery.

PRIOR ART LITERATURE

Patent Literature

Patent Literature 1: JP-A-2012-214176

SUMMARY OF THE INVENTION

Problem that the Invention is to Solve

Incidentally a size of a motor determines a maximum generation power of the motor which the motor can generate. In addition, it is generally known that the maximum generation power of a motor varies according to a rotation speed of the motor and that the maximum generation power becomes smaller as the rotation speed becomes faster. Consequently, in a motor connected to a wheel the maximum generation power of the motor becomes smaller as the vehicle speed becomes faster.

Conventionally, when a power running drive or a regenerative drive is executed by a motor connected to a wheel, a necessary brake application force is obtained based on a maximum generation power of the motor that is determined according to the size of the motor irrespective of a vehicle speed, and the power running drive and the regenerative drive by the motor are permitted in a zone where a brake application force exceeds the necessary brake application force. By doing so, the deterioration of a brake device is prevented by avoiding a risk of slippage taking place in the brake device as a result of the necessary brake application force that is needed when the motor generates power exceeding the brake application force.

However, it has been desired that the motor is used over as wide a range as possible from the viewpoint of improving the fuel economy. In addition, in using the motor, when attempting to control a power transmission device to be applied with an application force that exceeds the necessary brake application force irrespective of a vehicle speed, the consumed energy by the brake device is increased to a great level.

The invention provides a driving system which can expand a range over which a motor can be used.

Means for Solving the Problem

The invention provides the following aspects. According to a first aspect of the invention, there is provided a driving system (e.g., a driving system 100/a rear wheel driving system 1 in embodiment) including:

a motor (e.g., a motor 102/motors 2A, 2B in embodiment) that is connected to a wheel (e.g., a wheel W/rear wheels LWr, RWr in embodiment) of a vehicle so as to transmit power to the wheel;

a power transmission device (e.g., a clutch CL/hydraulic brakes 60A, 60B in embodiment) that is provided on a power transmission path between the motor and the wheel and that can change a power transmission capacity of the power transmission path by controlling an application force;

a motor controller (e.g., a motor controller 108a/a controller 8 in embodiment) that controls power that is generated by the motor, and an application force controller (e.g., an application force controller 108b/a controller 8 in embodiment) that controls the application force of the power transmission device, wherein the driving system further includes an application force acquiring device (e.g., an application force acquiring device 104/a sensor 92 in embodiment) that acquires a current application force which is an application force that the power transmission device is currently exerting, and wherein when the motor controller receives a request for generation of power in such a state that the motor generates no power, the motor controller controls to permit and/or prohibit the generation of power of the motor based on the current application force and a necessary application force (e.g., a necessary application force F in embodiment) which is an application force of the power transmission device that is needed to transmit a maximum generation power (e.g., a maximum torque T in embodiment) of the motor in a current rotating state quantity which is a rotating state quantity that the motor is currently having.

According to a second aspect of the invention, in the driving system according to the first aspect, when the current application force is smaller than the necessary application force, the generation of power of the motor is prohibited.

According to a third aspect of the invention, there is provided a driving system (e.g., the driving system 100/the rear wheel driving system 1 in embodiment) including:

a motor (e.g., the motor 102/the motors 2A, 2B in embodiment) that is connected to a wheel (e.g., the wheel W/the rear wheels LWr, RWr in embodiment) of a vehicle so as to transmit power to the wheel;

a power transmission device (e.g., the clutch CL/the hydraulic brakes 60A, 60B in embodiment) that is provided on a power transmission path between the motor and the wheel and that can change a power transmission capacity of the power transmission path by controlling an application force;

a motor controller (e.g., the motor controller 108a/the controller 8 in embodiment) that controls power that is generated by the motor; and an application force controller (e.g., the application force controller 108b/the controller 8 in embodiment) that controls the application force of the power transmission device, wherein the driving system further includes an application force acquiring device (e.g., the application force acquiring device 104/the sensor 92 in embodiment) that acquires a current application force which is an application force that the power transmission device is currently exerting, and wherein when the motor controller receives a request for an increase in power in such a state that the motor is generating power, the motor controller controls to permit and/or prohibit the increase in power of the motor based on the current application force and a necessary application force (e.g., a necessary application force F in embodiment) which is an application force of the power transmission device that is needed to transmit a maximum generation power (e.g., a maximum torque T in embodiment) of the motor in a current rotating state quantity which is a rotating state quantity that the motor is currently having.

According to a fourth aspect of the invention, in the driving system according to the third aspect, when the current application force is smaller than the necessary application force, the increase in power of the motor is prohibited.

According to a fifth aspect of the invention, there is provided a driving system (e.g., the driving system 100/the rear wheel driving system 1 in embodiment) including:

a motor (e.g., the motor 102/the motors 2A, 2B in embodiment) that is connected to a wheel (e.g., the wheel W/the rear wheels LWr, RWr in embodiment) of a vehicle so as to transmit power to the wheel;

a power transmission device (e.g., the clutch CL/the hydraulic brakes 60A, 60B in embodiment) that is provided on a power transmission path between the motor and the wheel and that can change a power transmission capacity of the power transmission path by controlling an application force;

a motor controller (e.g., the motor controller 108a/the controller 8 in embodiment) that controls power that is generated by the motor; and an application force controller (e.g., the application force controller 108b/the controller 8 in embodiment) that controls the application force of the power transmission device, wherein the driving system further includes an application force acquiring device (e.g., the application force acquiring device 104/the sensor 92 in embodiment) that acquires a current application force which is an application force that the power transmission device is currently exerting, and wherein when the motor controller receives a request for generation of power in such a state that the motor generates no power, the motor controller controls to permit and/or prohibit the generation of power of the motor based on a maximum generation power (e.g., a maximum torque T in embodiment) of the motor in a current rotating state quantity which is a rotating state quantity that the motor is currently having and a transmission allowable power that the current application force allows the power transmission device to transmit.

According to a sixth aspect of the invention, in the driving system according to the fifth aspect, when the transmission allowable power is smaller than the maximum generation power, the generation of power of the motor is prohibited.

According to a seventh aspect of the invention, there is provided a driving system (e.g., the driving system 100/the rear wheel driving system 1 in embodiment) including:

a motor (e.g., the motor 102/the motors 2A, 2B in embodiment) that is connected to a wheel (e.g., the wheel W/the rear wheels LWr, RWr in embodiment) of a vehicle so as to transmit power to the wheel;

a power transmission device (e.g., the clutch CL/the hydraulic brakes 60A, 60B in embodiment) that is provided on a power transmission path between the motor and the wheel and that can change a power transmission capacity of the power transmission path by controlling an application force;

a motor controller (e.g., the motor controller 108a/the controller 8 in embodiment) that controls power that is generated by the motor; and an application force controller (e.g., the application force controller 108b/the controller 8 in embodiment) that controls the application force of the power transmission device, wherein the driving system further includes an application force acquiring device (e.g., the application force acquiring device 104/the sensor 92 in embodiment) that acquires a current application force which is an application force that the power transmission device is currently exerting, and wherein when the motor controller receives a request for an increase in power in such a state that the motor is generating power, the motor controller controls to permit and/or prohibit the increase in power of the motor based on a maximum generation power (e.g., the maximum torque T in embodiment) of the motor in a current rotating state quantity which is a rotating state quantity that the motor is currently having and a transmission allowable power that the current application force allows the power transmission device to transmit.

According to an eighth aspect of the invention, in the driving system according to the seventh aspect, when the transmission allowable power is smaller than the maximum generation power, the increase in power is prohibited.

Advantages of the Invention

According to the first aspect, it is possible to expand the range over which the motor is used with consumed energy kept suppressed by controlling to permit and/or prohibit the motor from generating power in consideration of the current rotating state quantity of the motor than by using the conventional control in which the motor is permitted to generate power only over the range where the current application force of the power transmission device exceeds the necessary application force that is obtained based on the maximum generation power that is determined according to the size of the motor, irrespective of the rotating state quantity of the motor. In addition, when receiving the request for generation of power, since the motor controller can control to permit and/or prohibit the motor from generating power based on the request, irrespective of the magnitude of the request, not only can the control be simplified, but also the response is improved.

According to the second aspect, it is possible to suppress the slippage of the power transmission device by prohibiting the motor from generating power when the current application force of the power transmission device is smaller than the necessary application force of the power transmission device that is needed to transmit the maximum generation power of the motor in the current rotating state quantity of the motor, thereby making it possible to prevent the deterioration of the durability of the power transmission device.

According to the third aspect, it is possible to expand the range over which the motor is used with consumed energy kept suppressed by controlling to permit and/or prohibit the motor from increasing the power thereof in consideration of the current rotating state quantity of the motor than by using the conventional control in which the motor is permitted to increase the power thereof only over the range where the current application force of the power transmission device exceeds the necessary application force that is obtained based on the maximum generation power that is determined according to the size of the motor. In addition, when receiving the request for an increase in power, since the motor controller can control to permit and/or prohibit the motor from increasing the power based on the request, irrespective of the magnitude of the request, not only can the control be simplified, but also the response is improved.

According to the fourth aspect, it is possible to suppress the slippage of the power transmission device by prohibiting the motor from increasing the power thereof when the current application force of the power transmission device is smaller than the necessary application force of the power transmission device that is needed to transmit the maximum generation power of the motor in the current rotating state quantity of the motor, thereby making it possible to prevent the deterioration of the durability of the power transmission device.

According to the fifth aspect, it is possible to expand the range over which the motor is used with consumed energy kept suppressed by controlling to permit and/or prohibit the motor from generating power in consideration of the current rotating state quantity of the motor than by using the conventional control in which the motor is permitted to generate power only over the range where the transmission allowable power that the current application force allows to transmit exceeds the maximum generation power that is determined according to the size of the motor, irrespective of the rotating state quantity of the motor. In addition, when receiving the request for generation of power, since the motor controller can control to permit and/or prohibit the motor from generating power based on the request, irrespective of the magnitude of the request, not only can the control be simplified, but also the response is improved.

According to the sixth aspect, it is possible to suppress the slippage of the power transmission device by prohibiting the motor from generating power when the transmission allowable power of the power transmission device is smaller than the maximum generation power of the motor in the current rotating state quantity of the motor, thereby making it possible to prevent the deterioration of the durability.

According to the seventh aspect, it is possible to expand the range over which the motor is used with consumed energy kept suppressed by controlling to permit and/or prohibit the motor from increasing the power thereof in consideration of the current rotating state quantity of the motor than by using the conventional control in which the motor is permitted to increase the power thereof only over the range where the transmission allowable power that the current application force allows to transmit exceeds the maximum generation power that is determined according to the size of the motor, irrespective of the rotating state quantity of the motor. In addition, when receiving the request for an increase in power, since the motor controller can control to permit and/or prohibit the motor from increasing the power based on the request, irrespective of the magnitude of the request, not only can the control be simplified, but also the response is improved.

According to the eighth aspect, it is possible to suppress the slippage of the power transmission device by prohibiting the motor from increasing the power thereof when the transmission allowable power of the power transmission device is smaller than the maximum generation power of the motor in the current rotating state quantity of the motor, thereby making it possible to prevent the deterioration of the durability of the power transmission device.

BRIEF DESCRIPTION OF DRAWINGS

FIG. 15 is a table depicting relations between a front wheel driving system and the rear wheel driving system in various states of the vehicle together with operating states of motors and states of the hydraulic circuit.

MODE FOR CARRYING OUT THE INVENTION

Hereinafter, embodiments of a driving system according to the invention will be described based on the drawings.

First Embodiment

Figure 1:
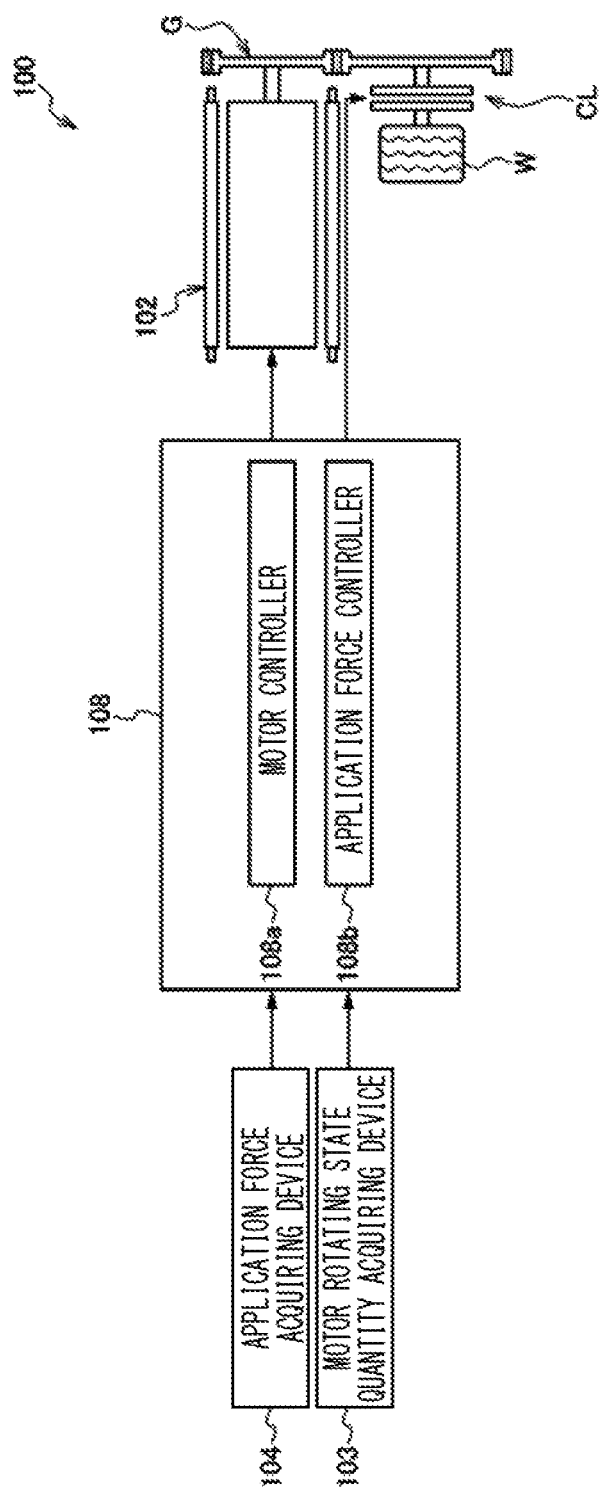
FIG. 1 is a block diagram showing a schematic configuration of a driving system according to a first embodiment of the invention.

As shown in FIG. 1, a driving system 100 of a first embodiment has a motor 102 and a clutch CL as a power transmission device that is provided on a power transmission path between the motor 102 and a wheel W. The clutch CL is a hydraulic clutch and can change a power transmission capacity of the power transmission path by being configured so as to change an application force.

A controller 108 of the driving system 100 includes a motor controller 108a for controlling a generation torque of the motor 102 and an application force controller 108b for controlling an application force of the clutch CL.

The application force controller 108b for controlling the application force of the clutch CL can control the application force of the clutch CL by controlling a rotation speed of an oil pump or controlling a hydraulic pressure of a hydraulic circuit.

The motor controller 108a for controlling the generation torque of the motor 102 controls the motor 102 to be in various states such as a power running drive state, a regeneration drive state and a halt state according to a request of a crew and the like. In general, in a motor, a maximum motor torque that the motor can generate is determined by a size thereof. Further, due to its nature, the motor torque that the motor can generate decreases as the rotation speed thereof increases. Consequently, the motor controller 108a controls the motor torque based on a motor rotation speed that is acquired by a motor rotating state quantity acquiring device 103.

The motor rotating state quantity acquiring device 103 may be a resolver that is provided on the motor 102 or may be a rotation speed sensor or a vehicle speed sensor that is provided on a rotational element (a gear, a shaft) of the power transmission path between the motor 102 and the wheel W, and the motor controller 108a can calculate a motor rotation speed from a motor rotating state quantity related to the motor rotation speed so acquired. In the driving system 100, since the motor 102 and the wheel W are connected together by way of a pair of gears Q the motor rotation speed is proportional to the vehicle speed.

Figure 2A:
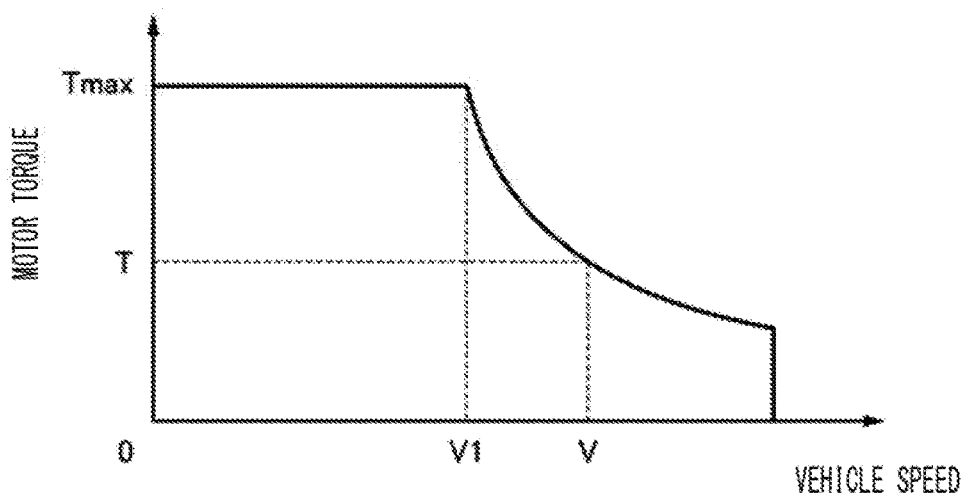
FIG. 2A is a motor torque-vehicle speed characteristic chart showing a relation between motor torque and vehicle speed.

With the motor 102 of the driving system 100, as shown in FIG. 2A, although a maximum motor torque Tmax can be generated until a vehicle speed V1 is reached, when the vehicle speed V1 is exceeded, the motor torque that the motor 102 can generate decreases gradually. Namely, at vehicle speeds V that are faster than the vehicle speed V1, the motor 102 is only allowed to generate a motor torque (a maximum torque T) that is smaller than the maximum motor torque Tmax.

Figure 2B:
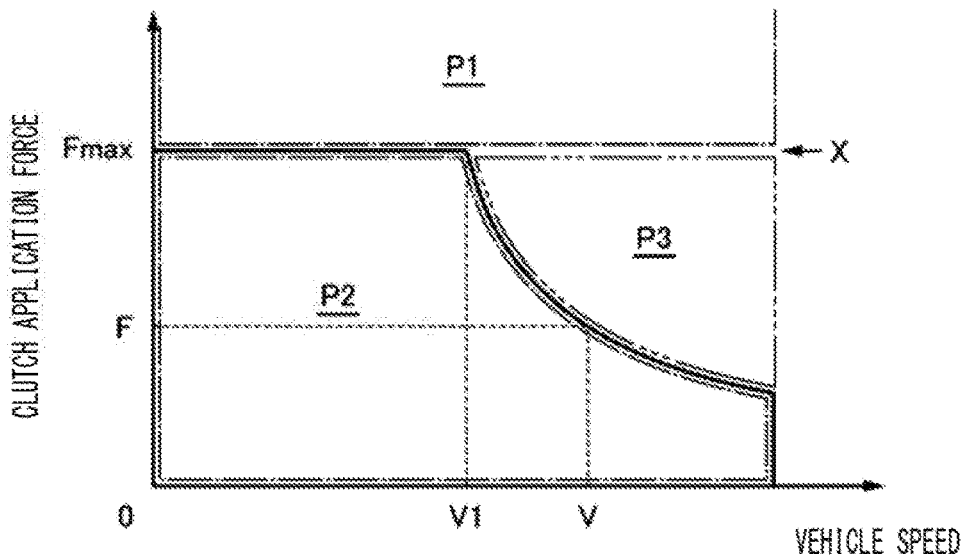
FIG. 2B is a clutch application force-vehicle speed characteristic chart showing a relation between clutch application force and vehicle speed.

FIG. 2B is a clutch application force-vehicle speed characteristic chart in which an application force that is needed to enable the transmission of motor torque is obtained from a relation between motor torque and vehicle speed in the motor torque-vehicle speed characteristic chart shown in FIG. 2A.

In a zone P1 in FIG. 2B, irrespective of vehicle speed, not only can all motor torque be theoretically transmitted to the wheel W but also all wheel torque can theoretically be transmitted from the wheel W to the motor 102 by operating the motor 102 (in a power running drive or regeneration drive) with the clutch CL applied. This is because the application force of the clutch CL is set at an application force that is equal to or greater than a necessary application force Fmax that is needed to transmit the maximum motor torque Tmax that the motor 102 can generate according to its size.

It should be noted that the application force of the clutch CL is acquired from an application force acquiring device 104. The application force acquiring device 104 may be a sensor for acquiring directly an application force for the clutch CL or may be a hydraulic pressure sensor that is provided on a hydraulic circuit for driving the clutch CL or a rotation speed sensor for an oil pump for supplying a hydraulic pressure to the hydraulic circuit, and the motor controller 108a can calculate an application force for the clutch CL from the hydraulic pressure or the rotation speed acquired from the sensors.

Returning to FIG. 2B, in a zone P2 and a zone P3 in FIG. 2B, even in a case where the motor 102 is operated (in the power running drive or regeneration drive) with the clutch CL applied, since the application force of the clutch CL is smaller than the necessary application force Fmax that is needed to transmit the maximum motor torque Tmax that the motor 102 can generate according to its size, there may occur a case where all the torque cannot be transmitted between the motor 102 and the wheel W. Consequently, conventionally, in the zone P2 and the zone P3 in FIG. 2B, the deterioration of the clutch CL that is triggered by the occurrence of a slippage in the clutch CL is prevented by prohibiting the operation of the motor 102 (stopping the motor 102) or by increasing the application force of the clutch to the necessary application force Fmax or greater to permit the operation of the motor 102.

In the zone P3 in FIG. 2B, however, even though a current application force that is an application force that the clutch CL is currently exerting is less than the necessary application force Fmax with which the maximum motor torque Tmax that the motor 102 can generate according to its size can be transmitted, since the current application force is greater than a necessary application force F resulting when a maximum torque T of the motor that is based on a motor rotation speed at the current vehicle speed V is generated, all the torque can theoretically be transmitted between the motor 102 and the wheel W.

Thus, the motor controller 108a of this embodiment expands a range over which the motor 102 is used without increasing the application force of the clutch CL more than needed by permitting the motor 102 to operate (in the power running drive or regeneration drive) in the zone P3 in FIG. 2B.

Specifically speaking, when receiving a request for generation of power in such a state that the motor 102 is generating no power, the motor controller 108a acquires a current motor rotation speed that is a rotation speed that the motor is currently having from the motor rotating state quantity acquiring device 103 and the current application force of the clutch CL from the application force acquiring device 104. Then, the motor controller 108a compares the necessary application force F resulting when the maximum torque T that is based on the current motor rotation speed (the vehicle speed V) of the motor 102 is generated with the current application force. The motor controller 108a prohibits the motor 102 from generating power in a case where the current application force is smaller than the necessary application force F, whereas in a case where the current application force is equal to or greater than the necessary application force F, the motor controller 108a permits the motor 102 to generate power without changing the application force of the clutch CL.

In addition, when receiving a request for an increase in power in such a state that the motor 102 is generating power, the motor controller 108a acquires a current motor rotation speed that is the current rotation speed of the motor from the motor rotating state quantity acquiring device 103 and the current application force of the clutch CL from the application force acquiring device 104. Then, the motor controller 108a compares the necessary application force F resulting when the maximum torque T that is based on the current motor rotation speed (the vehicle speed V) of the motor 102 is generated with the current application force. The motor controller 108a prohibits the motor 102 from increasing the power in a case where the current application force is smaller than the necessary application force F, whereas in a case where the current application force is equal to or greater than the necessary application force F, the motor controller 108a permits the motor 102 to increase the power without changing the application force of the clutch CL.

In this way, when compared with the conventional technique, the motor controller 108a can expand the range over which the motor 102 is used wider with consumed energy kept suppressed by controlling to permit the motor 102 to generate power or increase the power and to prohibit the motor 102 from operating based on the necessary application force F resulting when the maximum torque T of the motor 102 that is based on the current motor rotation speed is generated and the current application force. In addition, when receiving the request for generation of power and the request for an increase in power, since the motor controller 108a can control to permit and/or prohibit the motor 102 from generating power and increasing the power based on the requests, irrespective of the magnitude of the requests, not only can the control be simplified, but also the response is improved.

Namely, when the clutch CL is applied with an application force that is smaller than the necessary application force Fmax resulting when the maximum motor torque Tmax that is determined according to the size of the motor 102 is generated and the current application force is equal to or greater than the necessary application force F resulting when the maximum torque T of the motor 102 at the current motor rotation speed (the vehicle speed V) is generated, the motor controller 108a permits the motor 102 to operate to thereby allow the motor 102 to operate without controlling the application force of the clutch CL to exceed the necessary application force Fmax resulting when the maximum motor torque Tmax is generated which is determined according to the size of the motor 102.

Additionally, when the current application force of the clutch CL is smaller than the necessary application force F resulting when the maximum torque T of the motor 102 that is based on the current motor rotation speed (the vehicle speed V) is generated, the motor controller 108a prohibits the motor 102 from operating so as to suppresses the occurrence of slippage in the clutch, thereby making it possible to prevent the deterioration in durability of the clutch CL.

In this embodiment, when receiving the request for generation of power in such a state that the motor 102 is generating no power, the motor controller 108a controls to permit and/or prohibit the motor 102 from generating power based on the necessary application force F and the current application force. However, a configuration may be adopted in which the motor controller 108a acquires a maximum torque T of the motor 102 at the current motor rotation speed that is acquired from the motor rotating state quantity acquiring device 103 and acquires a transmission allowable power that is permitted to be transmitted by the current application force of the clutch CL that is acquired from the application force acquiring device 104, and controls to permit and/or prohibit the motor 102 from generating power based on the maximum torque T and the transmission allowable power. Then, in a case where the transmission allowable power is smaller than the maximum torque T, the motor controller 108a prohibits the motor 102 from generating power, whereas in a case where the transmission allowable power is equal to or greater than the maximum torque T, the motor controller 108a permits the motor 102 to generate power without changing the application force of the clutch CL.

Similarly, in this embodiment, when receiving the request for an increase in power in such a state that the motor 102 is generating power, the motor controller 108a controls to permit and/or prohibit the motor 102 from increasing the power based on the necessary application force F and the current application force. However, a configuration may be adopted in which the motor controller 108a acquires a maximum torque T of the motor 102 at the current motor rotation speed that is acquired from the motor rotating state quantity acquiring device 103 and acquires a transmission allowable power that is permitted to be transmitted by the current application force which is acquired from the application force acquiring device 104, and controls to permit and/or prohibit the motor 102 from increasing the power based on the maximum torque T and the transmission allowable power. Then, in a case where the transmission allowable power is smaller than the maximum torque T, the motor controller 108a prohibits the motor 102 from increasing the power, whereas in a case where the transmission allowable power is equal to or greater than the maximum torque T, the motor controller 108a permits the motor 102 to increase the power without changing the application force of the clutch CL.

Second Embodiment

Figure 3:
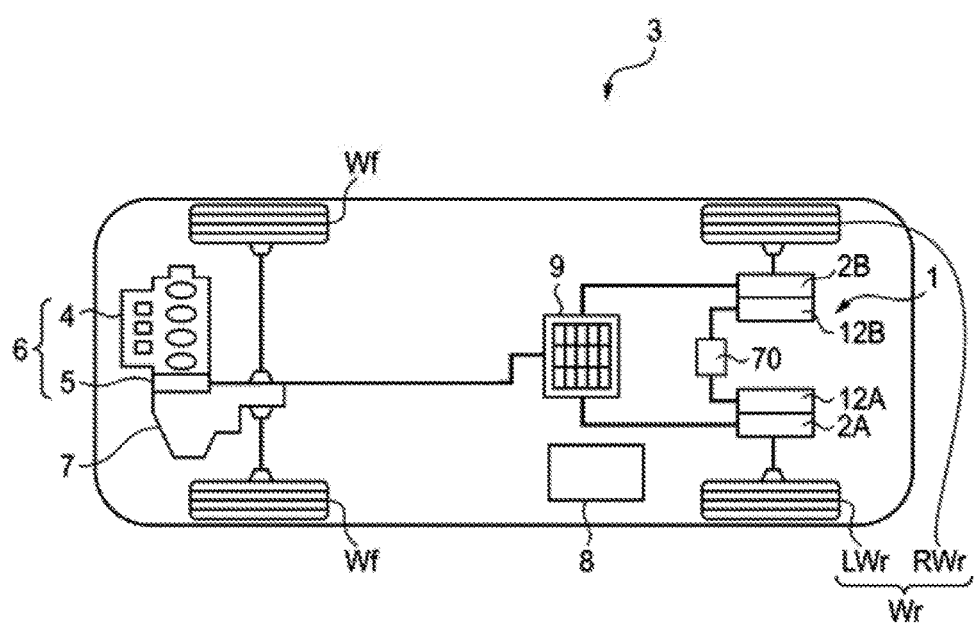
FIG. 3 is a block diagram showing a schematic configuration of a hybrid electric vehicle that constitutes an embodiment of a vehicle on which a driving system according to a second embodiment of the invention can be mounted.

A driving system 1 according to a second embodiment employs motors as drive sources to drive axle shafts and is employed on a vehicle having a driving system as shown in FIG. 3. In the following description, the driving system will be described as being used to drive rear wheels. However, the driving system may be used to drive front wheels.

A vehicle 3 shown in FIG. 3 is a hybrid electric vehicle having a driving system 6 (hereinafter, referred to as a "front wheel driving system") in which an internal combustion engine 4 and a motor 5 are connected in series at a vehicle front portion. Power of this front driving system 6 is transmitted to front wheels Wf by way of a transmission 7, while power of a driving system 1 (hereinafter, referred to as a "rear wheel driving system") which is provided separately from the front wheel driving system 6 at a vehicle rear portion is transmitted to rear wheels Wr (RWr, LWr). The motor 5 of the front wheel driving system 6 and motors 2A, 2B of the rear wheel driving system 1 on the rear wheels Wr side are connected to a battery 9, so that electric power can be supplied to the motors from the battery 9, while energies generated at the driving systems can be recovered to the battery 9 for regeneration. Reference numeral 8 denotes a controller configured to execute various controls for the whole of the vehicle.

Figure 4:
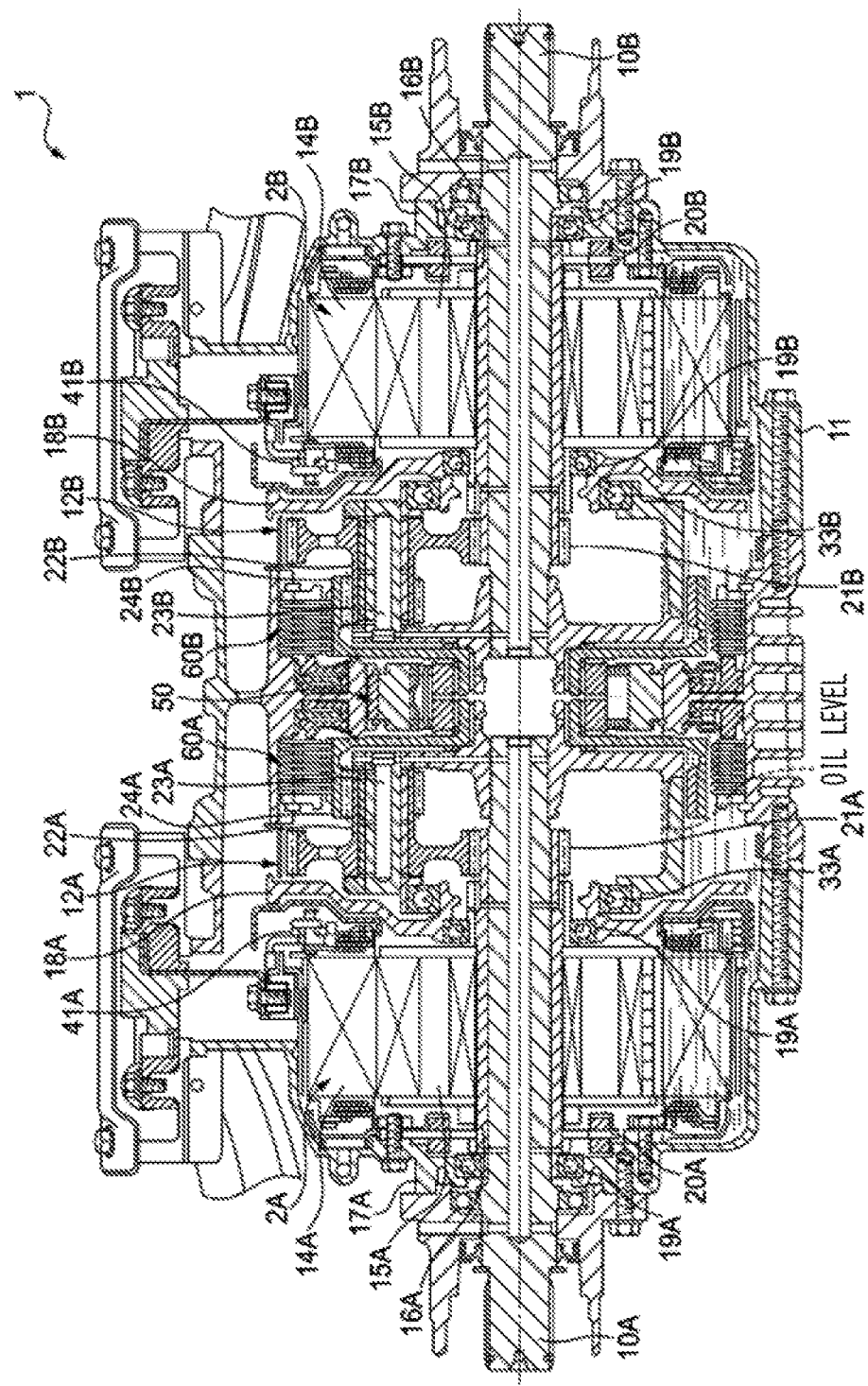
FIG. 4 is a vertical longitudinal sectional view of a rear wheel driving system according to the second embodiment.
Figure 6:
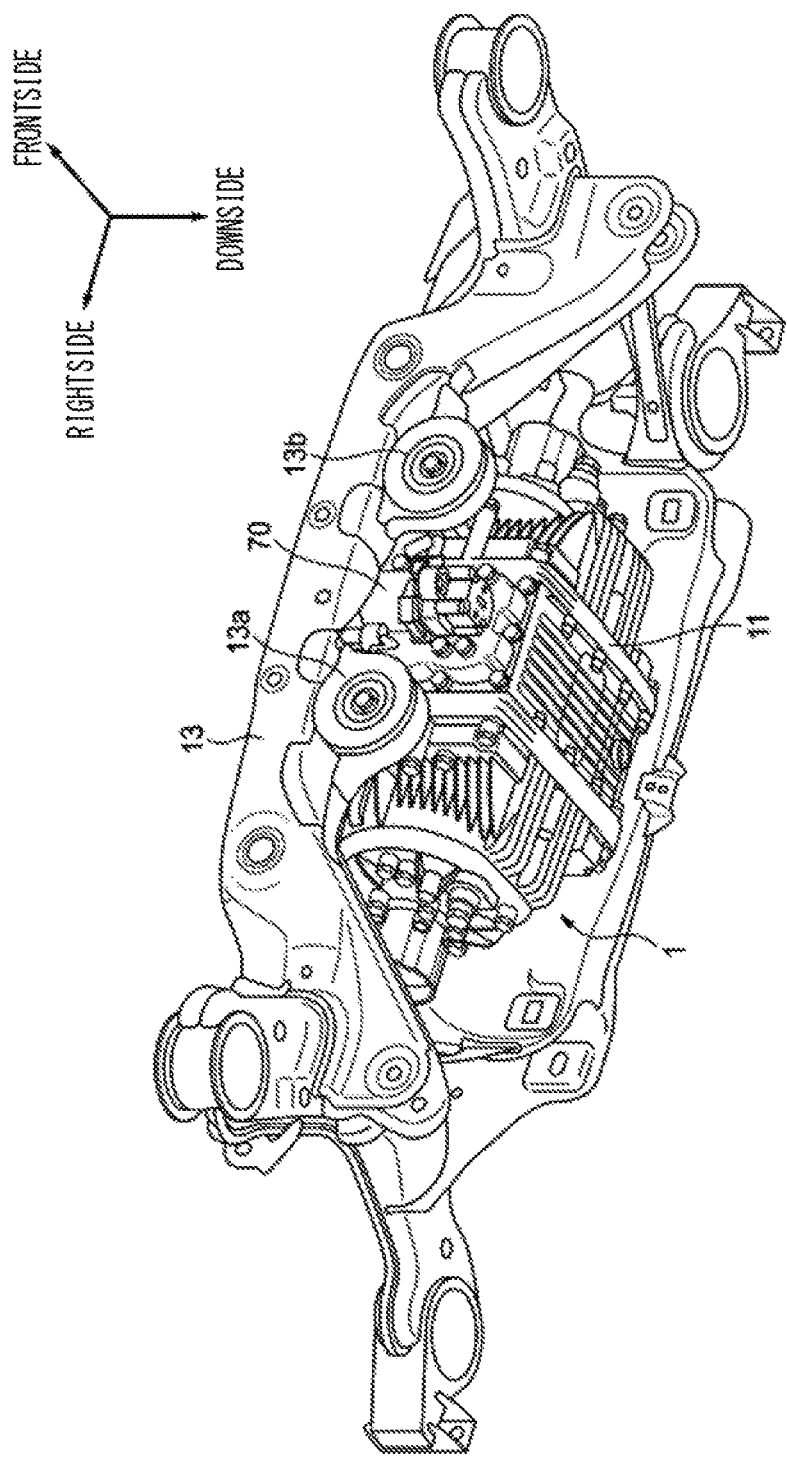
FIG. 6 is a perspective view showing a state in which the rear wheel driving system is mounted on a frame.

FIG. 4 shows a vertical longitudinal sectional view of the whole of the rear wheel driving system 1. In FIG. 4, reference numerals 10A, 10B denote left and right axle shafts of the rear wheels Wr of the vehicle 3, which are disposed so as to extend coaxially in a width direction of the vehicle 3. A speed reducer case 11 of the rear wheel driving system 1 has a substantially cylindrical shape as a whole. The motors 2A, 2B configured to drive the axle shafts and planetary gear type speed reducers 12A, 12B configured to decelerate the driving rotation of the motors 2A, 2B are disposed on the axle shafts 10A, 10B coaxially therewith, respectively, in an interior of the speed reducer case 11. The motor 2A and the planetary gear type speed reducer 12A control a left rear wheel LWr, and the motor 2B and the planetary gear type speed reducer 12B control a right rear wheel RWr. The motor 2A and the planetary gear type speed reducer 12A and the motor 2B and the planetary gear type speed reducer 12B are disposed laterally symmetrical with each other in the width direction within the speed reducer case 11. Then, as shown in FIG. 6, the speed reducer case 11 is supported by supporting portions 13*a*, 13*b* of a frame member 13 which makes up part of a frame which makes up, in turn, a framework of the vehicle 3 and a frame, not shown, of the rear wheel driving system 1. The supporting portions 13*a*, 13*b* are provided laterally symmetrical with respect to a center of the frame member 13 in the width direction. Arrows in FIG. 6 denote positional relations with the rear wheel driving system 1 mounted on the vehicle 3.

Respective stators 14A, 14B of the motors 2A, 2B are fixed in place inboards of left and right end sides of the speed reducer case 11, and annular rotors 15A, 15B are disposed, respectively, on inner circumferential sides of the stators 14A, 14B so as to rotate relatively to the corresponding stators 14A, 14B. Cylindrical shafts 16A, 16B, which surround outer circumferences of the axle shafts 10A, 10B, are connected to inner circumferential portions of the rotors 15A, 15B, respectively, and the cylindrical shafts 16A, 16B are supported in end walls 17A, 17B and middle walls 18A, 18B of the speed reducer case 11 via bearings 19A, 19B so as to rotate relatively together with the axle shafts 10A and 10B. Resolvers 20A, 20B, which functions as motor rotating state quantity acquiring devices, configured to detect rotation speeds of the rotors 15A, 15B are provided on outer circumferences of end portions of the cylindrical shafts 16A, 16B and on the end walls 17A, 17B of the speed reducer case 11.

The planetary gear type speed reducers 12A, 12B include sun gears 21A, 21B, ring gears 24A, 24B, pluralities of planetary gears 22A, 22B which mesh with the sun gears 21A, 21B and the ring gears 24A, 24B, and planetary carriers 23A, 23B which support the planetary gears 22A, 22B, respectively. Then, motor torque that is inputted from the sun gears 21A, 21B is configured to be outputted by way of the planetary carriers 23A, 23B.

Figure 5:
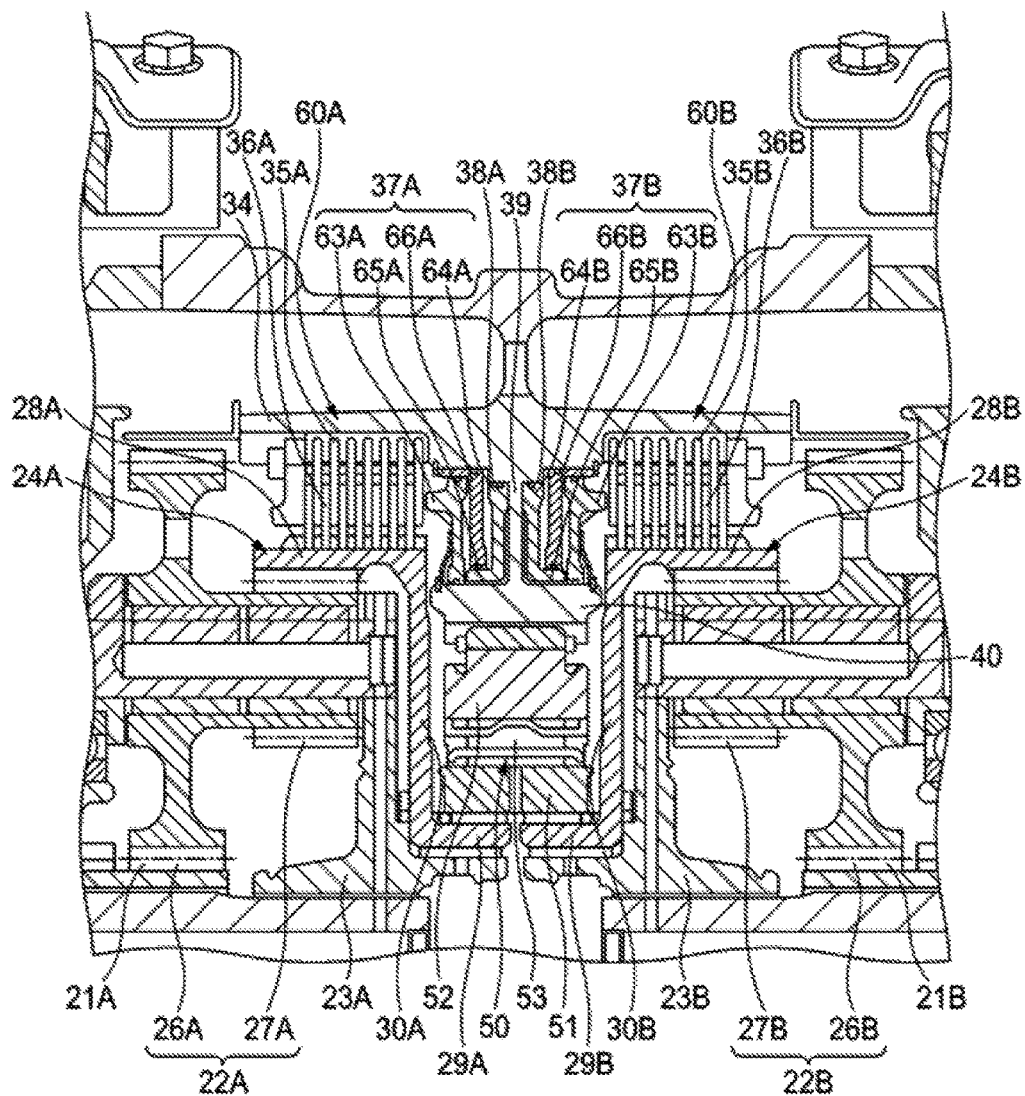
FIG. 5 is a partially enlarged sectional view of the rear wheel driving system shown in FIG. 4.

The sun gear 21A, 21B are formed integrally with the cylindrical shafts 16A, 16B, respectively. In addition, as shown in FIG. 5, for example, the planetary gears 22A, 22B are double pinions having first pinions 26A, 26B that are greater in diameter and which mesh directly with the sun gears 21A, 21B and second pinions 27A, 27B that are smaller in diameter than the first pinions 26A. 26B. The first pinions 26A, 26B and the second pinions 27A, 27B are formed integrally so as not only to be coaxial but also to be offset in an axial direction. The planetary gears 22A, 22B are supported on the planetary carriers 23A, 23B, respectively. The planetary carriers 23A, 23B extend radially inwards at axial inner end portions thereof and are then spline fitted on the axle shafts 10A, 10B, respectively, so as to be supported thereon, whereby the planetary carriers 23A, 23B are supported on the axle shafts 10A, 10B so as to rotate together. The planetary carriers 23A, 23B are also supported on the middle walls 18A, 18B via bearings 33A, 33B.

The middle walls 18A, 18B separate motor accommodation spaces where the motors 2A. 2B are accommodated individually from speed reducer accommodation spaces where the planetary gear type speed reducers 12A, 12B are accommodated and are formed so as to be bent or curved from a radially outer side towards a radially inner side so that an axial space defined therebetween expands. Then, bearings 33A, 33B, which support the planetary carriers 23A, 23B, respectively, are disposed on radially inner sides and sides facing the planetary gear type speed reducers 12A, 12B of the middle walls 18A, 18B. Additionally, bus rings 41A, 41B for the stators 14A, 14B are disposed on radially outer sides and sides facing the motors 2A, 2B of the middle walls 18A, 18B (refer to FIG. 4).

The ring gears 24A, 24B include gear portions 28A, 28B that mesh with the second pinion gears 27A, 27B, which are smaller in diameter, on inner circumferential surfaces thereof, small diameter portions 29A, 29B that are smaller in diameter than the gear portions 28A, 28B and which are disposed so as to face each other in a middle position of the speed reducer case 11, and connecting portions 30A, 30B that connect axial inner end portions of the gear portions 28A, 28B and axial outer end portions of the small diameter portions 29A, 29B together in a radial direction. In the case of this embodiment, a maximum diameter of the ring gears 24A, 24B is set so as to be smaller than a maximum distance of the first pinions 26A, 26B from centers of the axle shafts 10A, 10B. The small diameter portions 29A, 29B spline fit in an inner race 51 of a one-way clutch 50, which will be described later, and the ring gears 24A, 24B rotate together with the inner race 51 of the one-way clutch 50.

Incidentally, a cylindrical space portion is secured between the speed reducer case 11 and the ring gears 24A, 24B, and hydraulic brakes 60A, 60B, which make up brake devices for the ring gears 24A, 24B and function as power transmission devices, are disposed in the space portion so as to overlap the first pinions 26A, 26B in a radial direction and to overlap the second pinions 27A, 27B in an axial direction. In the hydraulic brakes 60A, 60B, pluralities of fixed plates 35A, 35B are spline fitted in an inner circumferential surface of a cylindrical radially outer support portion 34 that extends in the axial direction on a radially inner side of the speed reducer case 11, and pluralities of rotational plates 36A, 36B that are spline fitted on outer circumferential surfaces of the ring gears 24A, 24B are disposed alternately in the axial direction, respectively, and these plates 35A, 35B, 36A, 36B are operated so as to be engaged with and disengaged from each other by annular pistons 37A, 37B. The pistons 37A, 37B are accommodated so as to reciprocate back and forth freely in annular cylinder chambers 38A. 38B, respectively, which are defined between a laterally separating wall 39 which extends radially inwards from a middle position of the speed reducer case 11 and the radially outer support portion 34 and a radially inner support portion 40 which are connected together by the laterally separating wall 39. The pistons 37A, 37B are caused to move forwards or advance by introducing highly pressurized oil into the cylinder chambers 38A, 38B, and the pistons 37A, 37B are caused to move backwards or retreat by discharging the oil from the cylinder chambers 38A, 38B. As shown in FIG. 6, the hydraulic brakes 60A, 60B are connected to an electric oil pump 70 that is disposed between the supporting portions 13a, 13b of the frame member 13 described above.

To describe in more detail, the pistons 37A, 37B have first piston walls 63A, 63B and second piston walls 64A, 64B which are disposed forwards and backwards in the axial direction, and these piston walls 63A. 63B, 64A, 64B are connected together by cylindrical inner circumferential walls 65A, 65B. Consequently, annular spaces which open radially outwards are defined between the first piston walls 63A, 63B and the second piston walls 64A, 64B, and these annular spaces are partitioned laterally in the axial direction by partition members 66A, 66B which are fixed to inner circumferential surfaces of outer walls of the cylinder chambers 38A, 38B, respectively. Spaces defined between the laterally separating wall 39 of the speed reducer case 11 and the second piston walls 64A, 64B are made into first operation chambers S (refer to FIG. 7) into which highly pressurized oil is introduced directly, and spaces defined between the partition members 66A, 66B and the first piston walls 63A. 63B are made into second operation chambers S2 (refer to FIG. 7) which communicate with the first operation chambers S1 by way of through holes formed in the inner circumferential walls 65A, 65B. Spaces defined between the second piston walls 64A, 64B and the partition members 66A, 66B communicate with the atmospheric pressure.

In the hydraulic brakes 60A, 60B, oil is introduced into the first operation chambers S1 and the second operation chambers S2 from a hydraulic circuit 71, which will be described later, whereby the fixed plates 35A, 35B and the rotational plates 36A, 36B are pressed against each other by means of the pressure of the oil applied to the first piston walls 63A. 63B and the second piston walls 64A, 64B. Consequently, a large pressure receiving area can be obtained by the first and second piston walls 63A, 63B, 64A, 64B which are arranged laterally in the axial direction. Therefore, a great pressing force against the fixed plates 35A, 35B and the rotational plates 36A, 36B can be obtained while restricting radial areas of the pistons 37A, 37B from being increased.

In the case of these hydraulic brakes 60A, 60B, the fixed plates 35A, 35B are supported on the radially outer support portion 34 which extend from the speed reducer case 11, while the rotational plates 36A, 36B are supported on the ring gears 24A, 24B. Therefor, when both the plates 35A, 35B, 36A. 36B are pressed against by the pistons 37A, 37B, braking force is applied to the ring gears 24A. 24B as a result of frictional application of both the plates 35A, 35B and 36A, 36B, whereby the ring gears 24A, 24B are fixed. Then, when the application of both the plates 35A, 35B and 36A, 36B by the pistons 37A, 37B is released, the ring gears 24A, 24B are permitted to rotate freely.

A space portion is also ensured between the connecting portions 30A and 30B of the ring gears 24A and 24B facing each other in the axial direction. Then, a one-way clutch 50 is disposed within the space portion, the one-way clutch 50 being configured to transmit only power in one direction to the ring gears 24A, 24B and to cut off power in the other direction. The one-way clutch 50 includes a large number of sprags 53 interposed between inner races 51 and an outer race 52, and the inner races 51 are configured to rotate together with the small diameter portions 29A and 29B of the ring gears 24A and 24B through spline fitting. In addition, the outer race 52 is positioned and is prevented from rotating by the radially inner support portion 40. The one-way clutch 50 is engaged to lock the rotation of the ring gears 24A and 24B when the vehicle 3 travels forwards by means of the power by the motors 2A and 2B. To be more specific, the one-way clutch 50 is engaged when forward rotational power of the motors 2A and 2B (rotational power by means of which the vehicle 3 is cased to travel forwards) is input into the rear wheels Wr, whereas the one-way clutch 50 is disengaged when reverse rotational power of the motors 2A and 2B is input into the rear wheels Wr. Then, the one-way clutch 50 is disengaged when forward rotational power of the rear wheels Wr is input into the motors 2A and 2B, whereas the one-way clutch 50 is engaged when reverse rotational power of the rear wheels Wr is input into the motors 2A and 2B.

In this way, in the rear wheel driving system 1 of this embodiment, the one-way clutch 50 and the hydraulic brakes 60A, 60B are provided parallel on power transmission paths between the motors 2A. 2B and the rear wheels Wr.

Next, referring to FIGS. 7 to 10, the hydraulic circuit that makes up a hydraulic pressure controller of the rear wheel driving system 1 will be described.

The hydraulic circuit 71 can supply oil that is sucked in from a sucking port 70a that is provided in an oil pan 80 and which is discharged from the electric oil pump 70 to the first operation chambers S1 of the hydraulic brakes 60A, 60B by way of a low pressure oil path selector valve 73 and a brake oil path selector valve 74 and can supply the same oil to a lubricating and cooling portion 91 for the motors 2A, 2B and the planetary gear type speed reducers 12A, 12B by way of the low pressure oil path selector valve 73. The oil that is discharged from the electric oil pump 70 and is then supplied to the lubricating and cooling portion 91 for the motors 2A, 2B and the planetary gear type speed reducers 12A, 12B is reserved in the speed reducer case 11. Normally, lower portions of the stators of the motors 2A. 2B and lower portions of the planetary carriers 23A, 23B are situated in the oil reserved in the speed reducer case 11, and when the planetary carriers 23A. 23B rotate, the oil constitutes stirring resistance to thereby generate rotation loss. Additionally, when an oil level in the speed reducer case 11 is inclined as a result of the vehicle being turned, for example, lower portions of the rotors of the motors 2A, 2B are also situated in the oil reserved in the speed reducer case 11 to thereby generate rotation loss.

The electric oil pump 70 can be driven (or be operated) in at least two modes of a high-pressure mode and a low-pressure mode by a motor 90 that is made up of a position sensorless brushless direct current motor, is controlled through PID control and can control hydraulic pressures in each of those modes. Reference numeral 92 denotes a sensor that functions as an application force acquiring device for detecting an oil temperature and an oil or hydraulic pressure of a brake oil path 77.

The low pressure oil path selector valve 73 is connected to a first line oil path 75a situated to face the electric oil pump 70 and making up a line oil path 75, a second line oil path 75b situated to face the brake oil path selector valve 74 and making up the line oil path 75, a first low pressure oil path 76a that communicates with the lubricating and cooling portion 91 and a second low pressure oil path 76b that communicates with the lubricating and cooling portion 91.

In addition, the low pressure oil path selector valve 73 includes a valve body 73a that normally establishes a communication between the first line oil path 75a and the second line oil path 75b and which selectively establishes a communication between the line oil path 75 and the first low pressure oil path 76a or the second low pressure oil path 76b, a spring 73b that biases the valve body 73a in a direction (to the right in FIG. 7) in which a communication is established between the line oil path 75 and the first low pressure oil path 76a, and an oil chamber 73c for pressing the valve body 73a in a direction (to the left in FIG. 7) in which a communication is established between the line oil path 75 and the second low pressure oil path 76b by means of a hydraulic pressure in the line oil path 75. Consequently, the valve body 73a is biased in the direction (to the right in FIG. 7) in which the communication is established between the line oil path 75 and the first low pressure oil path 76a by the spring 73b and is pressed against in the direction (to the left in FIG. 7) in which the communication is established between the line oil path 75 and the second low pressure oil path 76b by means of the hydraulic pressure in the line oil path 75 that is inputted into the oil chamber 73c at a right end of the low pressure oil line selector valve 73 shown in FIG. 7.

Figure 8A:
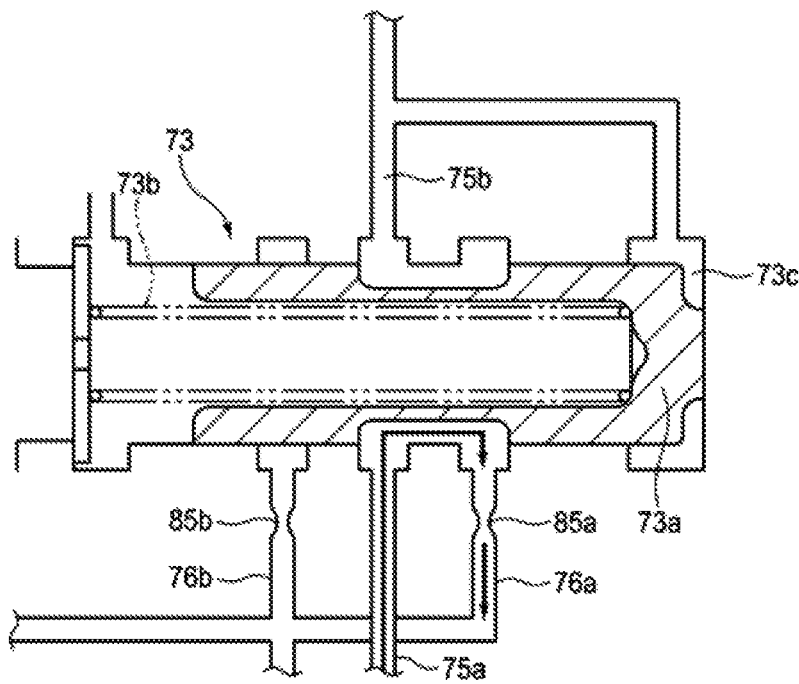
FIG. 8A is an explanatory diagram showing a low pressure fluid path selector valve being situated in a low pressure side position.
Figure 8B:
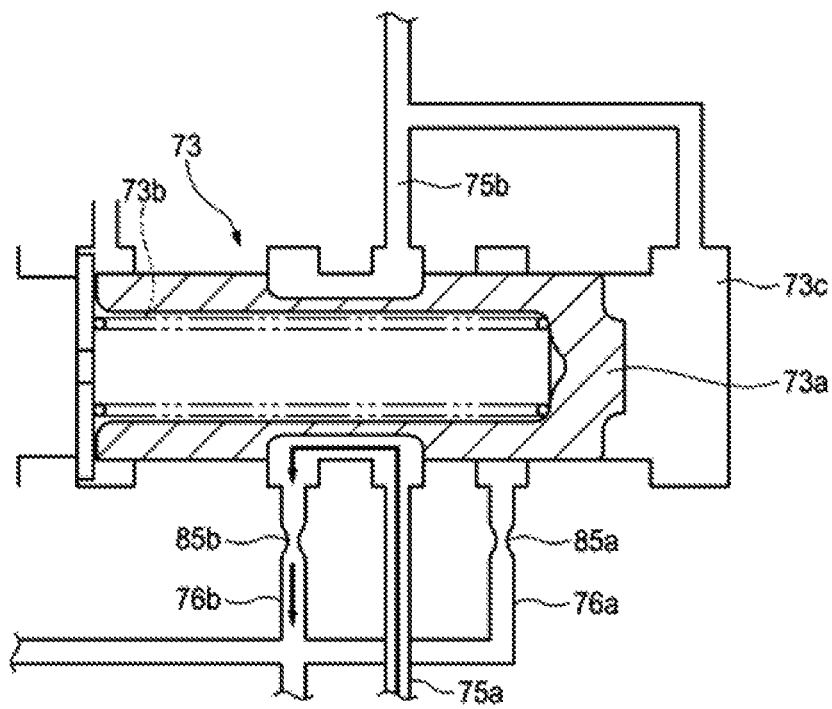
FIG. 8B is an explanatory diagram showing the low pressure fluid path selector valve being situated in a high pressure side position.

Here, with a hydraulic pressure in the line oil path 75 that is inputted into the oil chamber 73c while the electric oil pump 70 is being operated in the low pressure mode, the biasing force of the spring 73b is set so that the valve body 73a is kept stationary, whereby the line oil path 75 is cut off from the second low pressure oil path 76b and is caused to communicate with the first low pressure oil path 76a as shown in FIG. 8A (hereinafter, a position of the valve body 73a shown in FIG. 8B will be referred to as a low pressure side position.), and with a hydraulic pressure in the line oil path 75 that is inputted into the oil chamber 73c while the electric oil pump 70 is being operated in the high pressure mode, the biasing force of the spring 73b is set so that the valve body 73a is moved, whereby the line oil path 75 is cut off from the first low pressure oil path 76a and is caused to communicate with the second low pressure oil path 76b as shown in FIG. 8B (a position of the valve body 73a shown in FIG. 8B will be referred to as a high pressure side position.).

The brake oil path selector valve 74 is connected to the second line oil path 75b that makes up the line oil path 75, the brake oil path 77 that is connected to the hydraulic brakes 60A, 60B, and a reservoir portion 79 by way of a high position drain 78. The brake oil path selector valve 74 includes a valve body 74a that establishes and cuts off a communication between the second line oil path 75b and the brake oil path 77, a spring 74b that biases the valve body 74a in a direction (to the right in FIG. 7) in which a communication between the second line oil path 75b and the brake oil path 77 is cut off, and an oil chamber 74c for pressing the valve body 74a in a direction (to the left in FIG. 7) in which a communication between the second line oil path 75b and the brake oil path 77 is established by means of a hydraulic pressure in the line oil path 75. Consequently, the valve body 74a can be biased in the direction (to the right in FIG. 7) in which the communication is cut off between the second line oil path 75b and the brake oil path 77 by the spring 74b and can be pressed against in the direction (to the left in FIG. 7) in which the communication is established between the second line oil path 75b and the brake oil path 77 by means of the hydraulic pressure in the line oil path 75 that is inputted into the oil chamber 74c.

Figure 9A:
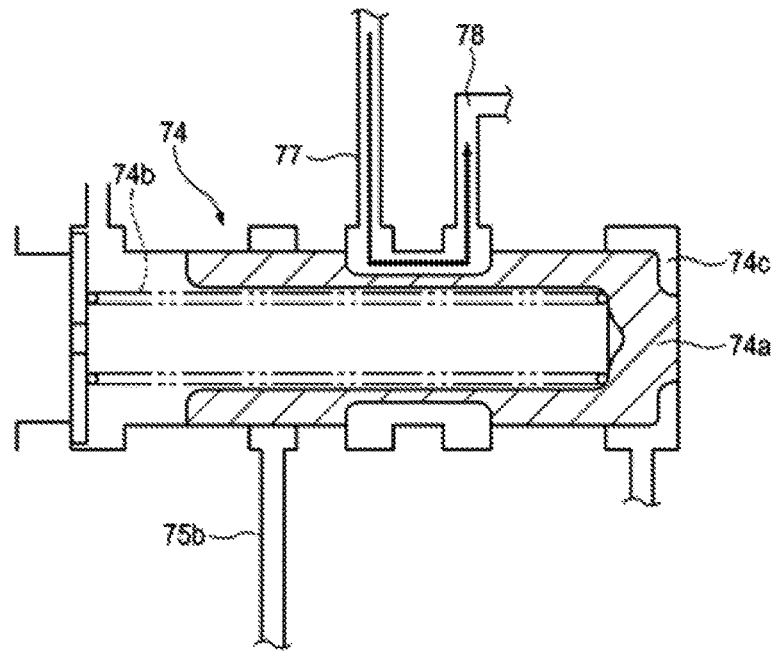
FIG. 9A is an explanatory diagram showing a brake fluid path selector valve being situated in a closed position.
Figure 9B:
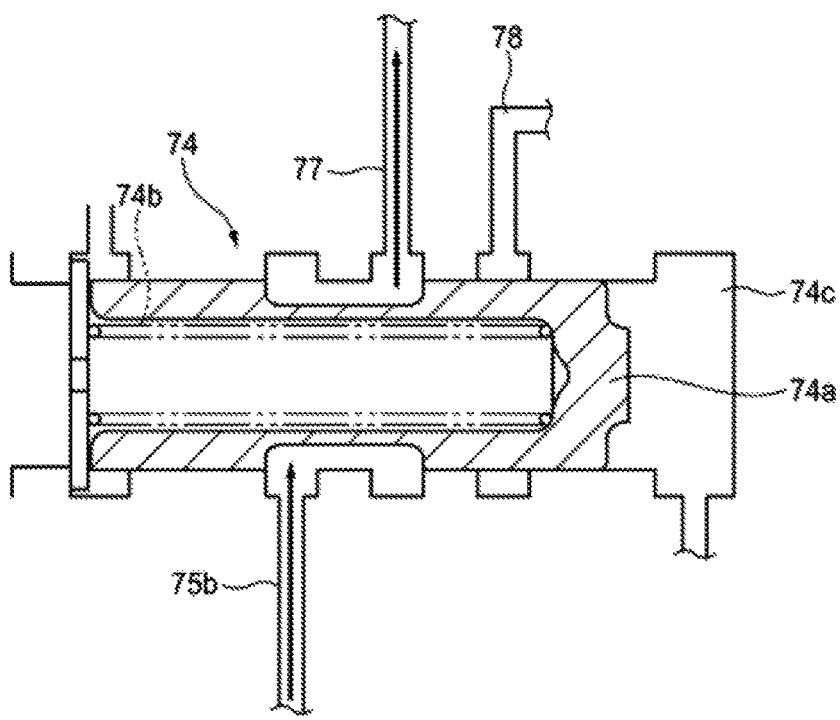
FIG. 9B is an explanatory diagram showing the brake fluid path selector valve being situated in an open position.

The biasing force of the spring 74b is set so that the valve body 74a is caused to move from a valve closing position in FIG. 9A to a valve opening position in FIG. 9B by means of a hydraulic pressure in the line oil path 75 that is inputted into the oil chamber 74c while the electric oil pump 70 is being operated in the low pressure mode and the high pressure mode, whereby the brake oil path 77 is cut off from the high position drain 78 and is caused to communicate with the second line oil path 75b. Namely, the hydraulic pressure in the line oil path 75 that is inputted into the oil chamber 74c whether the electric oil pump 70 is operated in the low pressure mode or the high pressure mode exceeds the biasing force of the spring 74b, whereby the brake oil path 77 is cut off from the high position drain 78 and is caused to communicate with the second line oil path 75b.

With the second line oil path 75b cut off from the brake oil path 77, the hydraulic brakes 60A, 60B are caused to communicate with the reservoir portion 79 by way of the brake oil path 77 and the high position drain 78. Here, the reservoir portion 79 is provided in a position that is higher than the oil pan 80 in a vertical direction, or more preferably, the reservoir portion 79 is provided so that a vertically uppermost portion of the reservoir portion 79 is situated in a position that is higher than a middle point in the vertical direction between a vertically uppermost portion and a vertically lowermost portion of the first operation chambers S1 of the hydraulic brakes 60A, 60B. Consequently, with the brake oil path selector valve 74 closed, oil reserved in the first operation chambers S1 of the hydraulic brakes 60A, 60B is not discharged directly into the oil pan 80 but is discharged into the reservoir portion 79 for storage therein. Oil overflowing from the reservoir portion 79 is designed to be discharged into the oil pan 80. A reservoir portion side end portion 78a of the high position drain 78 is connected to a bottom surface of the reservoir portion 79.

The oil chamber 74c of the brake oil path selector valve 74 can be connected to the second line oil path 75b that makes up the line oil path 75 by way of a pilot oil path 81 and a solenoid valve 83. The solenoid valve 83 is made up of a three-way solenoid valve that is controlled by the controller 8, and when a solenoid 174 (refer to FIGS. 10A and 10B) of the solenoid valve 83 is left deenergized by the controller 8, the second line oil path 75b is connected to the pilot oil path 81, so that a hydraulic pressure in the line oil path 75 is inputted into the oil chamber 74c.

Figure 10A:
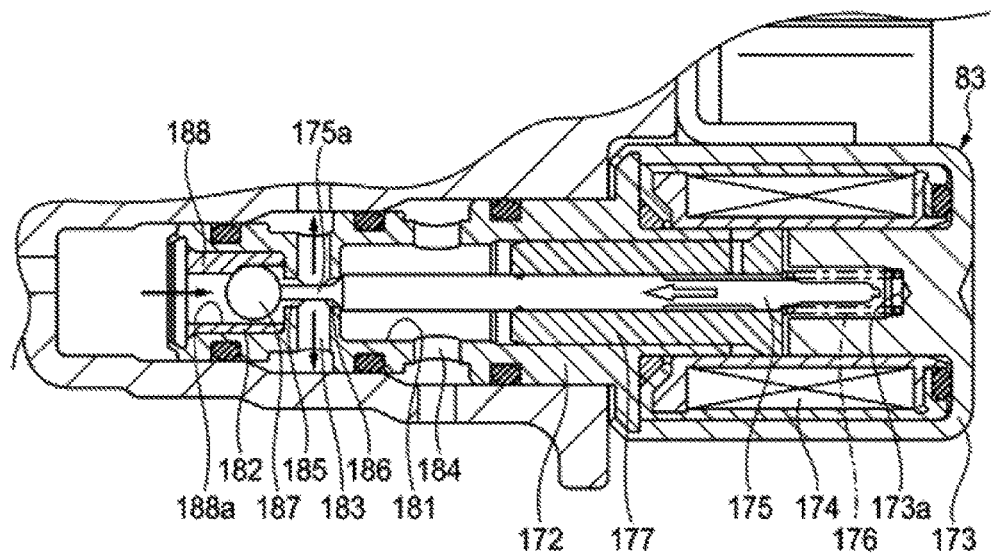
FIG. 10A is an explanatory diagram showing a solenoid valve being in a non-energized state.
Figure 10B:
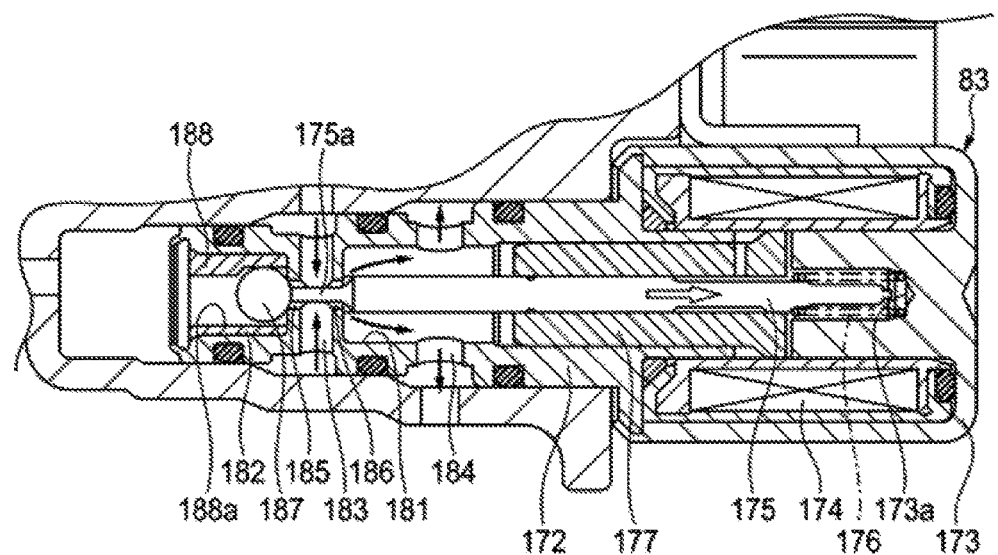
FIG. 10B is an explanatory diagram showing the solenoid valve being in an energized state.

As shown in FIGS. 10A and 10B, the solenoid valve 83 includes a three-way valve member 172, the solenoid 174 that is provided in a case member 173 and which receives electric power by way of a cable, not shown, to be excited, a solenoid valve body 175 that receives an exciting force of the solenoid 174 to be drawn to the right, a solenoid spring 176 that is accommodated in a spring holding recessed portion 173a that is formed in a center of the case member 173 to bias the solenoid valve body 175 to the left, and a guide member 177 that is provided within the three-way valve member 172 to guide forward and backward sliding movements of the solenoid valve body 175 therein.

The three-way valve member 172 is a bottomed, substantially cylindrical member and has a right recessed hole 181 that is formed from a right end portion to a substantially middle portion along a center line thereof, a left recessed hole 182 that is formed from a left end portion to the vicinity of the right recessed hole 181 similarly along the center line thereof, a first radial hole 183 that is formed between the right recessed hole 181 and the left recessed hole 182 along a direction that is at right angles to the center line, a second radial hole 184 that communicates with the substantially middle portion of the right recessed hole 181 and which is formed along the direction that is at right angles to the center line, a first axial hole 185 that is formed along the center line to allow the left recessed hole 182 to communicate with the first radial hole 183, and a second axial hole 186 that is formed along the center line to allow the first radial hole 183 to communicate with the right recessed hole 181.

In addition, a ball 187, configured to open and close the first axial hole 185, is placed in a bottom portion of the left recessed hole 182 of the three-way valve member 172 so as to move in a left-right direction, and a cap 188, configured to restrict the ball 187 from being dislocated from the left recessed hole 182, is fitted in an entrance side of the left recessed hole 182. A through hole 188a is formed along the center line to communicate with the first axial hole 185 in the cap 188.

The second axial hole 186 is opened and closed as a result of a root portion of an opening and closing projection 175a that is formed at a left end portion of the solenoid valve body 175 that moves left and right being brought into disconnection therefrom and connection thereto, respectively. The ball 187 configured to open and close the first axial hole 185 is moved left and right by a distal end portion of the opening and closing projection 175a of the solenoid valve body 175 that moves left and right.

Then, in the solenoid valve 83, when the solenoid 174 is deenergized (no electric power is supplied to the solenoid 174), as shown in FIG. 10A, the solenoid valve body 175 receives the biasing force of the solenoid spring 176 to thereby be moved to the left, whereby the distal end portion of the opening and closing projection 175a of the solenoid valve body 175 pushes on the ball 187 to open the first axial hole 185 and the root portion of the opening and closing projection 175a of the solenoid valve body 175 is brought into contact with the second axial hole 186 to close the second axial hole 186. By doing so, the second line oil path 75b that makes up the line oil path 75 communicates with the oil chamber 74c from the first axial hole 185 and the first radial hole 183 by way of the pilot oil path 81 (hereinafter, a position of the solenoid valve body 175 shown in FIG. 10A will be referred to as a valve opening position from time to time.).

In addition, when the solenoid 174 is energized (electric power is supplied to the solenoid 174), as shown in FIG. 10B, the solenoid valve body 175 receives the exciting force of the solenoid 174 and then moves to the right against the biasing force of the solenoid spring 176, whereby a hydraulic pressure from the through hole 188a pushes on the ball 187 to close the first axial hole 185 and the root portion of the opening and closing projection 175a of the solenoid valve body 175 moves away from the second axial hole 186 to thereby open the second axial hole 186. By doing so, oil that is reserved in the oil chamber 74c is discharged into the oil pan 80 by way of the first radial hole 183, the second axial hole 186 and the second radial hole 184, whereby the second line oil path 75b is cut off from the pilot oil path 81 (hereinafter, a position of the solenoid valve body 175 shown in FIG. 10B will be referred to as a valve closing position from time to time.).

Returning to FIG. 7, in the hydraulic circuit 71, the first low pressure oil path 76a and the second low pressure oil path 76b merge together on a downstream side to make up a low pressure common path 76c, and a relief valve 84 is connected to the merging portion to reduce a hydraulic pressure in the low pressure common oil path 76c by discharging oil therein into the oil pan 80 by way of a relief drain 86 when a line pressure of the low pressure common oil path 76c reaches or exceeds a predetermined pressure.

Here, as shown in FIGS. 8A and 8B, orifices 85a, 85b, which function as flow path resistance devices, are formed on the first low pressure oil path 76a and the second low pressure oil path 76b, respectively, and the orifice 85a of the first low pressure oil path 76a is given a larger diameter than that of the orifice 85b of the second low pressure oil path 76b. Consequently, a flow resistance in the second low pressure oil path 76b is greater than a flow resistance in the first low pressure oil path 76a, and a pressure reduction quantity in the second low pressure oil path 76b while the electric oil pump 70 is being operated in the high pressure mode becomes greater than a pressure reduction quantity in the first low pressure oil path 76a while the electric oil pump 70 is being operated in the low pressure mode, whereby the hydraulic pressures in the low pressure common oil path 76c in the high pressure mode and the low pressure mode become substantially equal.

In the low pressure oil path selector valve 73 that is connected to the first low pressure oil path 76a and the second low pressure oil path 76b in the way described above, while the electric oil pump 70 is being operated in the low pressure mode, the biasing force of the spring 73b surpasses the hydraulic pressure in the oil chamber 73c, whereby the valve body 73a is positioned in the low pressure side position by means of the biasing force of the spring 73b, and the line oil path 75 is cut off from the second low pressure oil path 76b and is caused to communicate with the first low pressure oil path 76a. Oil flowing through the first low pressure oil path 76a is subjected to the flow path resistance at the orifice 85a whereby the pressure thereof is reduced and then reaches the lubricating and cooling portion 91 by way of the low pressure common oil path 76c. On the other hand, while the electric oil pump 70 is being operated in the high pressure mode, the hydraulic pressure in the oil chamber 73c surpasses the biasing force of the spring 73b, whereby the valve body 73a is positioned in the high pressure side position against the biasing force of the spring 73b, and the line oil path 75 is cut off from the first low pressure oil path 76a and is caused to communicate with the second low pressure oil path 76b. Oil flowing through the second low pressure oil path 76b is subjected to a greater flow resistance at the orifice 85b than that at the orifice 85a whereby the pressure thereof is reduced and then reaches the lubricating and cooling portion 91 by way of the low pressure common oil path 76c.

Consequently, when the operation mode of the electric oil pump 70 is switched from the low pressure mode to the high pressure mode, the oil path is automatically switched from the oil path whose flow resistance is small to the oil path whose flow path resistance is great according to a change in hydraulic pressure in the line oil path 75, and therefore, a risk is suppressed of an excessive amount of oil being supplied to the lubricating and cooling portion 91 when the electric oil pump 70 is being operated in the high pressure mode.

In addition, a plurality of orifices 85c are provided on an oil path extending from the low pressure common oil path 76c to the lubricating and cooling portion 91 as other flow path resistance devices. The plurality of orifices 85c are set so that a minimum flow path sectional area of the orifice 85a of the first low pressure oil path 76a becomes smaller than a minimum flow path sectional area of the plurality of orifices 85c. Namely, the flow path resistance of the orifice 85a of the first low pressure oil path 76a is set greater than a flow path resistance of the plurality of orifices 85c. As this occurs, the minimum flow path sectional area of the plurality of orifices 85*c* is a total sum of minimum flow path sectional areas of the individual orifices 85*c*. By doing so, oil can be controlled so as to flow at a desired flow rate by the orifice 85*a* of the first low pressure oil path 76*a* and the orifice 85*b* of the second low pressure oil path 76*b*.

Here, the controller 8 (refer to FIG. 3) is a controller that executes various controls of the whole of the vehicle, and vehicle speeds, steering angles, accelerator pedal positions AP, shift positions, SOC and fluid or oil temperatures are inputted into the controller 8, whereas a signal for controlling the internal combustion engine 4, a signal for controlling the motors 2A, 2B, signals indicating generating state, charged state and discharged state in the battery 9, a control signal to the solenoid 174 of the solenoid valve 83, and a control signal for controlling the electric oil pump 70 are outputted from the controller 8.

Namely, the controller 8 includes at least a function as a motor controller for controlling the motors 2A. 2B and a function as a power transmission device controller for controlling the hydraulic brakes 60A. 60B that act as power transmission devices. The function as the motor controller is similar to that of the motor controller 108*a* in the first embodiment, and the function as the power transmission device controller is similar to that of the application force controller 108*b* in the first embodiment. The application force of the hydraulic brakes 60A, 60B is controlled by controlling the electric oil pump 70 and the solenoid 174 of the solenoid valve 83 as will be described herebelow.

Next, the operation of the hydraulic circuit 71 of the rear wheel driving system 1 will be described.

Figure 7:
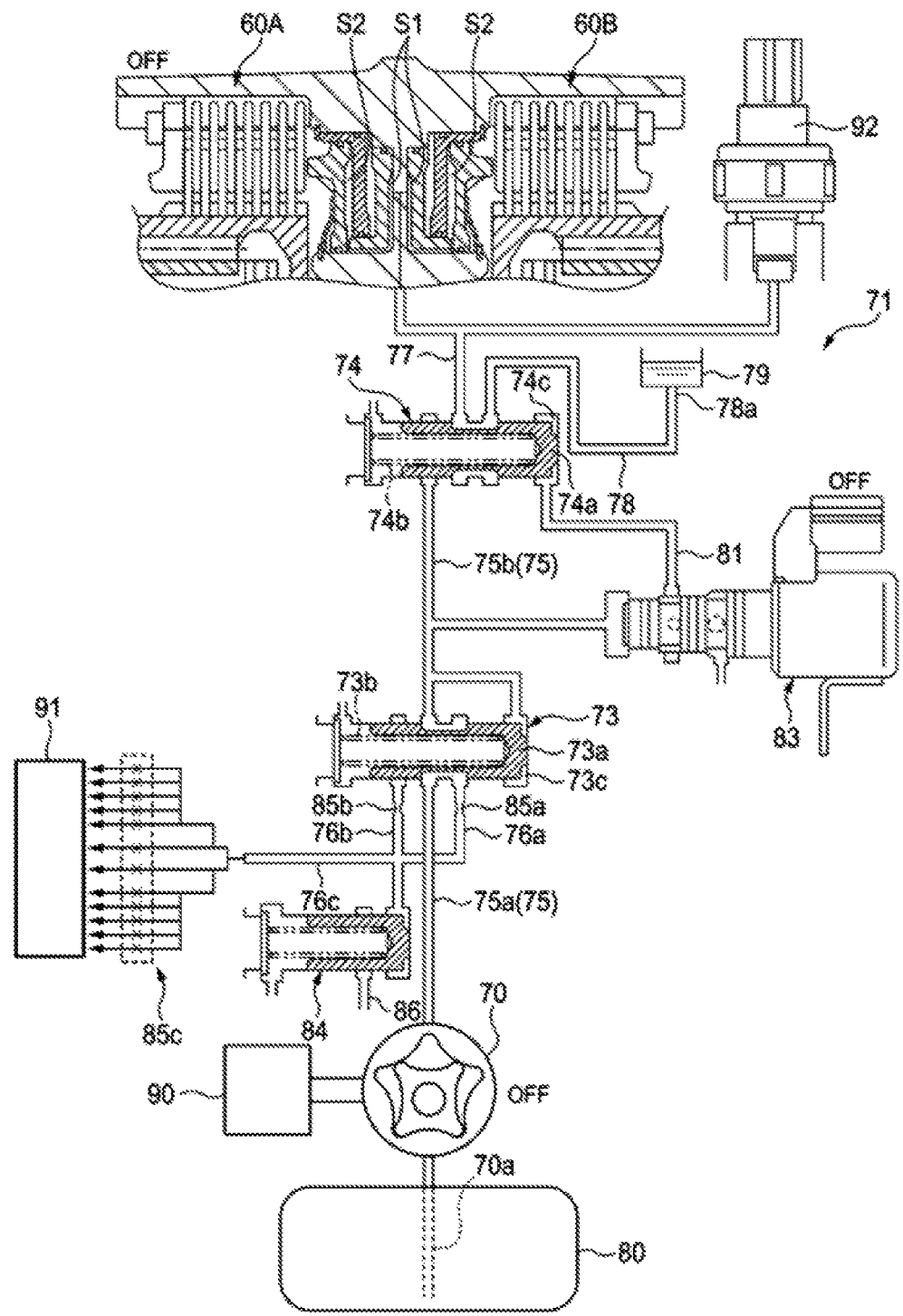
FIG. 7 is a hydraulic circuit diagram of a hydraulic pressure controller for controlling hydraulic brakes and is a hydraulic circuit diagram showing a state where no hydraulic pressure is supplied.

FIG. 7 shows the hydraulic circuit 71 in which the hydraulic brakes 60A, 60B are released with the vehicle staying at a halt. In this state, the controller 8 does not operate the electric oil pump 70. By doing so, the valve body 73*a* of the low pressure oil path selector valve 73 is positioned in the low pressure side position, and the valve body 74*a* of the brake oil path selector valve 74 is positioned in the valve closing position, whereby no hydraulic pressure is supplied to the hydraulic circuit 71.

Figure 11:
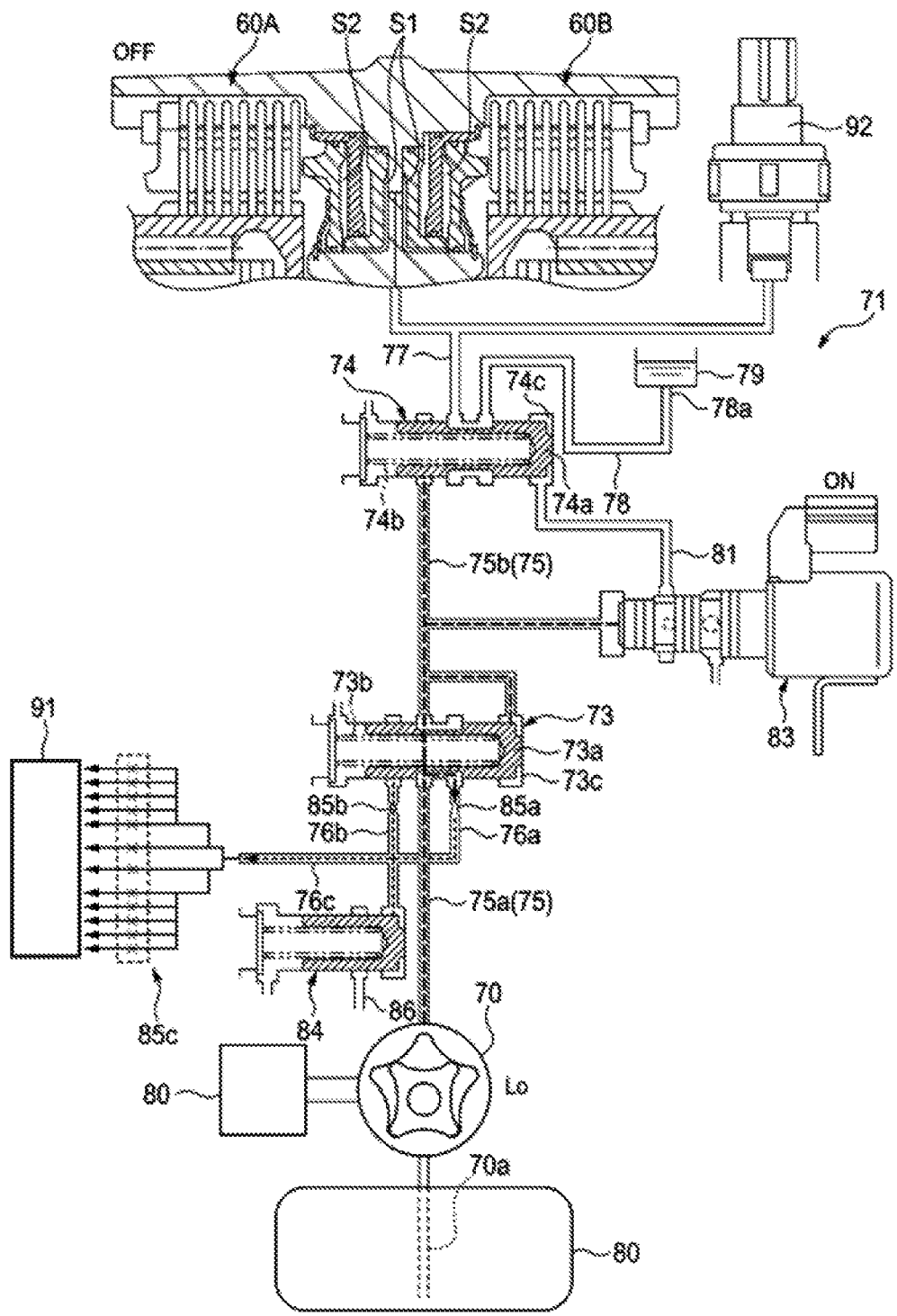
FIG. 11 is a hydraulic circuit diagram of the hydraulic pressure controller in a state where the hydraulic brakes are released while the vehicle is running (EOP: Low pressure mode).

FIG. 11 shows the hydraulic circuit 71 in which the hydraulic brakes 60A, 60B are released with the vehicle running. In this state, the controller 8 operates the electric oil pump 70 in the low pressure mode. In addition, the controller 8 energizes the solenoid 174 of the solenoid valve 83, whereby the second line oil path 75*b* is cut off from the pilot oil path 81. By doing so, the valve body 74*a* of the brake oil path selector valve 74 is positioned in the valve closing position by means of the biasing force of the spring 74*b*, whereby the second line oil path 75*b* is cut off from the brake oil path 77 while the brake oil path 77 is caused to communicate with the high position drain 78, whereby the hydraulic brakes 60A, 60B are released. Then, the brake oil path 77 is connected to the reservoir portion 79 by way of the high position drain 78.

In addition, in the low pressure oil path selector valve 73, since the biasing force of the spring 73*b* is greater than the hydraulic pressure in the line oil path 75 that results while the electric oil pump 70 is being operated in the low pressure mode and which is inputted into the oil chamber 73*c* at the right end in the figure, the valve body 73*a* is positioned in the low pressure side position, whereby the line oil path 75 is cut off from the second low pressure oil path 76*b* and is caused to communicate with the first low pressure oil path 76*a*. By doing so, the pressure of oil in the line oil path 75 is reduced at the orifice 85*a* by way of the first low pressure oil path 76*a* and the oil is then supplied to the lubricating and cooling portion 91.

Figure 12:
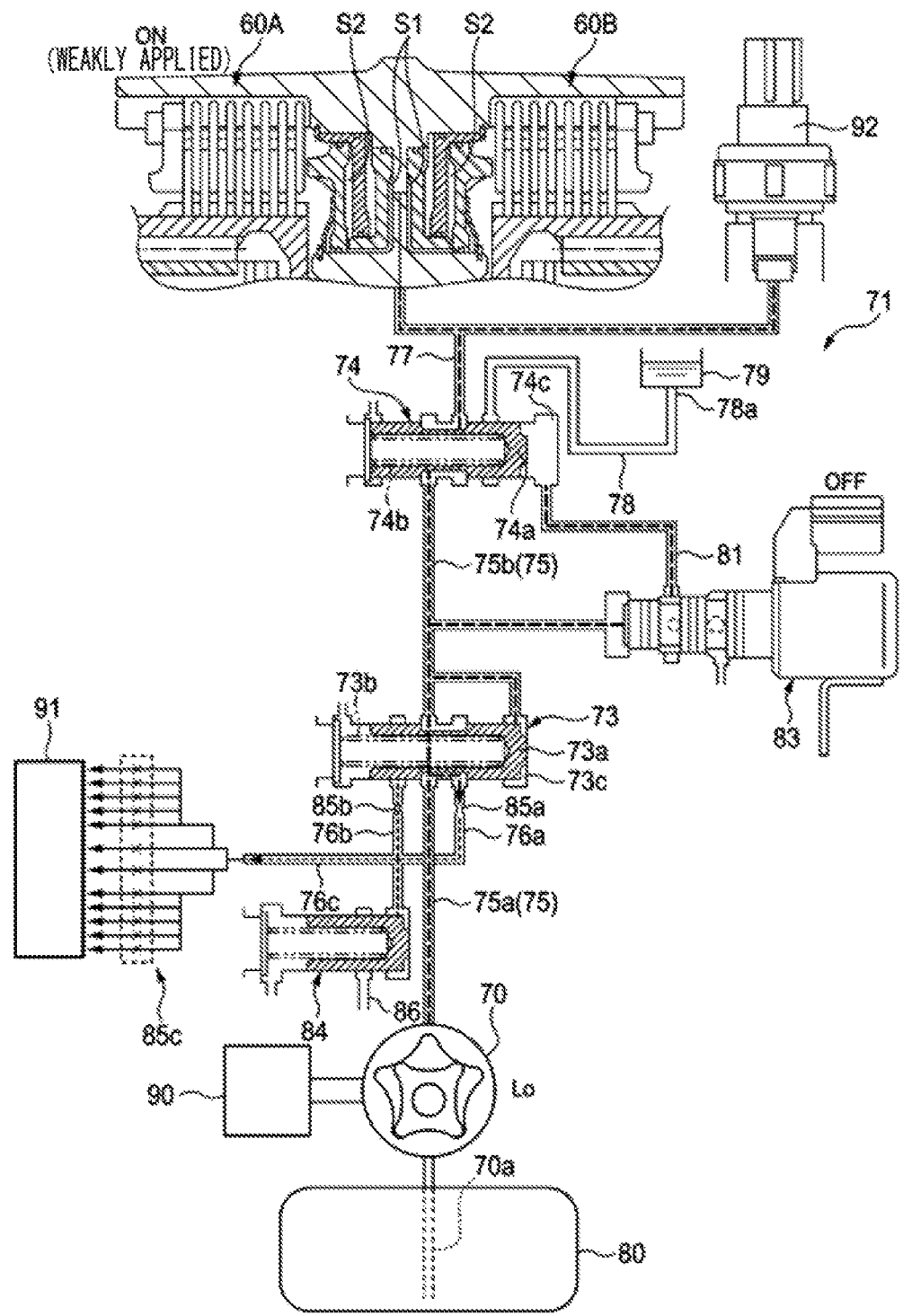
FIG. 12 is a hydraulic circuit diagram of the hydraulic pressure controller in a state where the hydraulic brakes are applied weakly (EOP: Low pressure mode).

FIG. 12 shows the hydraulic circuit 71 in which the hydraulic brakes 60A, 60B are weakly applied. The weakly applied state means a state in which although power can be transmitted, the hydraulic brakes 60A, 60B are applied with an application force that is weaker than an application force with which the hydraulic brakes 60A, 60B are applied normally. As this occurs, the controller 8 operates the electric oil pump 70 in the low pressure mode. Additionally, the controller 8 deenergizes the solenoid 174 of the solenoid valve 83, causing the hydraulic pressure in the second line oil path 75*b* to be inputted into the oil chamber 74*c* of the brake oil path selector valve 74. By doing so, the hydraulic pressure in the oil chamber 74*c* surpasses the biasing force of the spring 74*b*, and hence, the valve body 74*a* is positioned in the valve opening position, whereby the brake oil path 77 is cut off from the high position drain 78, while the second line oil path 75*b* is caused to communicate with the brake oil path 77, and the hydraulic brakes 60A, 60B are weakly applied.

In this case, too, as in the case where the hydraulic brakes 60A, 60B are released, in the low pressure oil path selector valve 73, since the biasing force of the spring 73*b* is greater than the hydraulic pressure in the line oil path 75 that results while the electric oil pump 70 is being operated in the low pressure mode and which is inputted into the oil chamber 73*c* at the right end in the figure, the valve body 73*a* is positioned in the low pressure side position, whereby the line oil path 75 is cut off from the second low pressure oil path 76*b* and is caused to communicate with the first low pressure oil path 76*a*. By doing so, the pressure of oil in the line oil path 75 is reduced at the orifice 85*a* by way of the first low pressure oil path 76*a* and the oil is then supplied to the lubricating and cooling portion 91.

Figure 13:
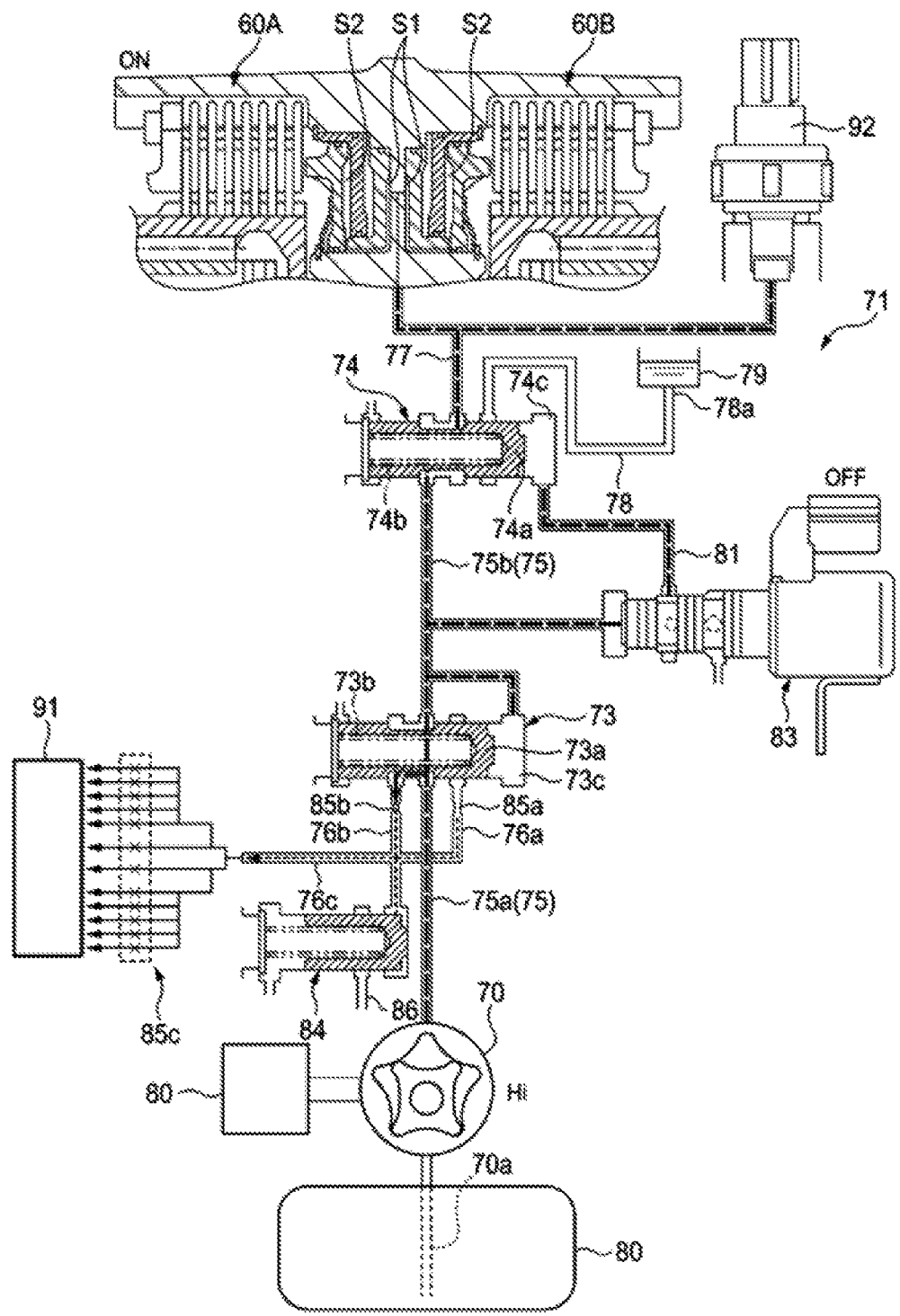
FIG. 13 is a hydraulic circuit diagram of the hydraulic pressure controller in a state where the hydraulic brakes are applied (EOP: High pressure mode).

FIG. 13 shows the hydraulic circuit 71 in which the hydraulic brakes 60A, 60B are applied. As this occurs, the controller 8 operates the electric oil pump 70 in the high pressure mode. Additionally, the controller 8 deenergizes the solenoid 174 of the solenoid valve 83, causing the hydraulic pressure in the second line oil path 75*b* to be inputted into the oil chamber 74*c* at a right end of the brake oil path selector valve 74. By doing so, the hydraulic pressure in the oil chamber 74*c* surpasses the biasing force of the spring 74*b*, and hence, the valve body 74*a* is positioned in the valve opening position, whereby the brake oil path 77 is cut off from the high position drain 78, while the second line oil path 75*b* is caused to communicate with the brake oil path 77, and the hydraulic brakes 60A, 60B are applied.

In the low pressure oil path selector valve 73, since the hydraulic pressure in the line oil path 75 that results while the electric oil pump 70 is being operated in the high pressure mode and which is inputted into the oil chamber 73*c* at the right end in the figure is greater than the biasing force of the spring 73*b*, the valve body 73*a* is positioned in the high pressure side position, whereby the line oil path 75 is cut off from the first low pressure oil path 76*a* and is caused to communicate with the second low pressure oil path 76*b*. By doing so, the pressure of oil in the line oil path 75 is reduced at the orifice 85*b* by way of the second low pressure oil path 76*b* and the oil is then supplied to the lubricating and cooling portion 91.

In this way, the controller 8 can release or apply the hydraulic brakes 60A. 60B to thereby disconnect or connect the motors 2A, 2B and the rear wheels Wr by controlling the operation mode (the operating state) of the electric oil pump 70 and the opening and closing of the solenoid valve 83 and can control the application force of the hydraulic brakes 60A, 60B.

Figure 14:
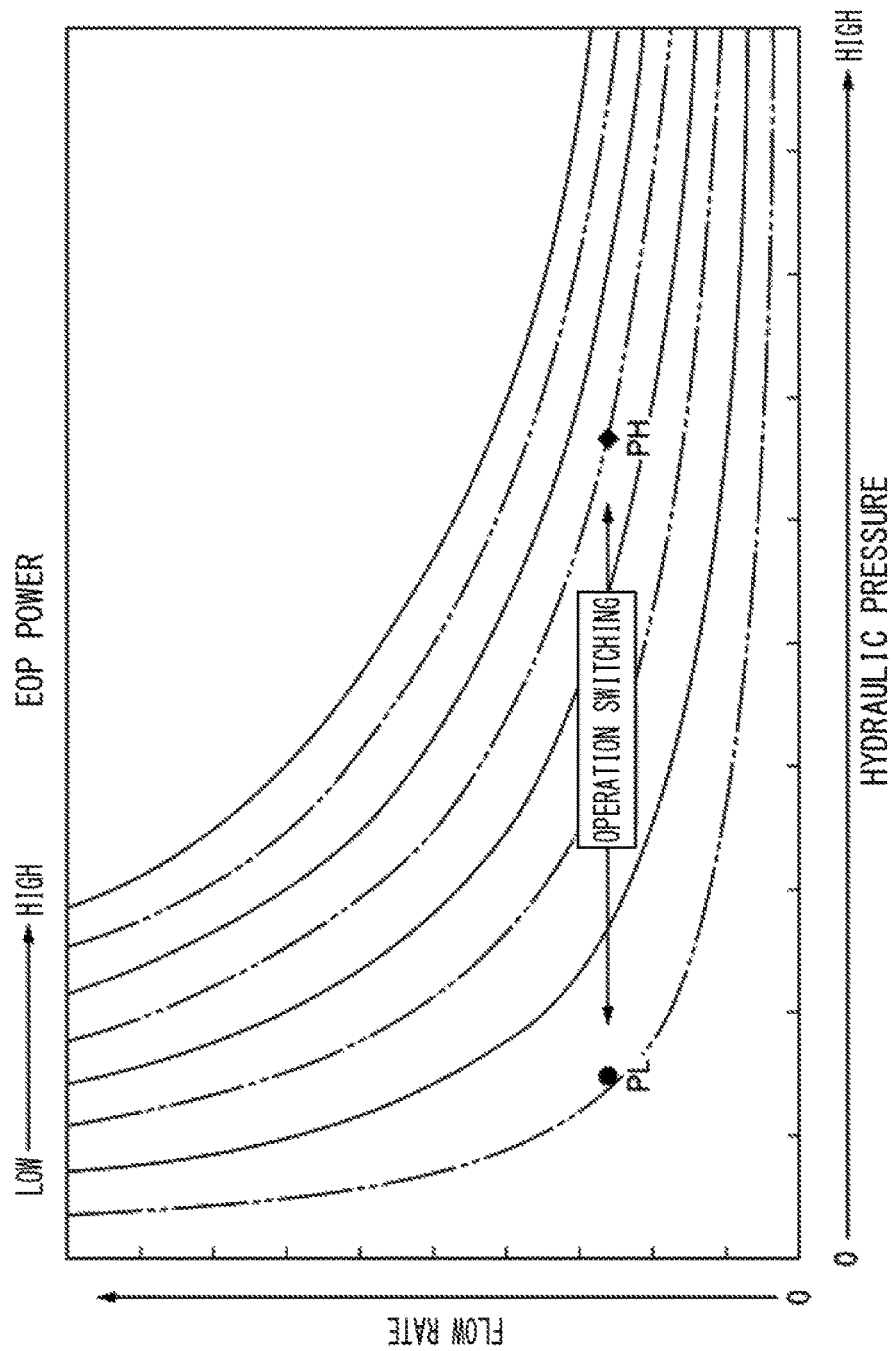
FIG. 14 is a graph showing load characteristics of an electric oil pump.

FIG. 14 is a graph showing load characteristics of the electric oil pump 70.

As shown in FIG. 14, in the low pressure mode (hydraulic pressure PL), the power (work done per unit time) of the electric oil pump 70 can be reduced to of the order of one fourth to one fifth of that of the electric oil pump 70 in the high pressure mode (hydraulic pressure PH) while maintaining the flow rate of oil supplied. Namely, in the low pressure mode, the load of the electric oil pump 70 is small, and hence, the consumed power of the motor 90 which drives the electric oil pump 70 can be reduced more than in the high pressure mode.

FIG. 15 is a table depicting relations between the front wheel driving system 6 and the rear wheel driving system 1 in various states of the vehicle together with operating states of the motors 2A, 2B and states of the hydraulic circuit 71. In the figure, a front unit represents the front wheel driving system 6, a rear unit represents the rear wheel driving system 1, a rear motor represents the motors 2A, 2B, EOP represents the electric oil pump 70. SOL represents the solenoid 174, OWC represents the one-way clutch 50, and BRK represents the hydraulic brakes 60A, 60B. Additionally, FIGS. 16 to 21 show speed collinear diagrams in various states of the rear wheel driving system 1. In the figures, S and C on a left-hand side represent the sun gear 21A of the planetary gear type speed reducer 12A connected to the motor 2A and the planetary carrier 23A connected to the axle shaft 10A, respectively, S and C on a right-hand side represent the sun gear 21B of the planetary gear type speed reducer 12B connected to the motor 2B and the planetary carrier 23B connected to the axle shaft 10B, respectively, R represents the ring gears 24A, 24B, BRK represents the hydraulic brakes 60A, 60B, and OWC represents the one-way clutch 50. In the following description, the rotational directions of the sun gears 21A, 21B which are rotated by the motors 2A, 2B when the vehicle travels forwards will be referred to as a forward direction. Additionally, in the figures, upward motions of the sun gears and the planetary carriers from a state where the vehicle is at a halt represent forward rotations of the motors, downward motions thereof represent reverse rotations of the motors, upward arrows represent forward torque, and downward arrows represent reverse torque.

Figure 16:
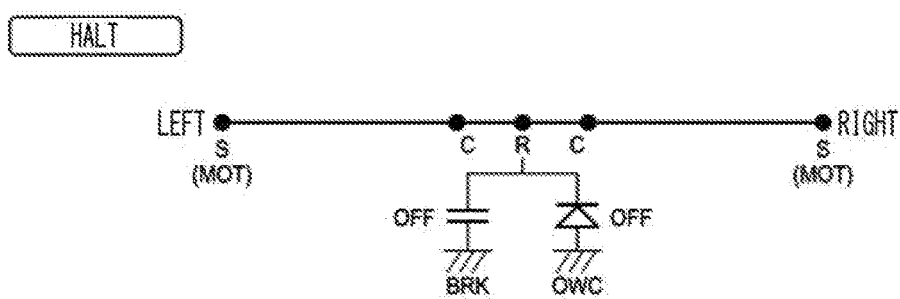
FIG. 16 is a speed collinear diagram of the rear wheel driving system while the vehicle is at a halt.

When the vehicle is at a halt, both the front wheel driving system 6 and the rear wheel driving system 1 are not driven. Consequently, as shown in FIG. 16, the motors 2A, 2B of the rear wheel driving system 1 are not in operation, and hence, the axle shafts 10A, 10B are not in operation, either. Therefore, no torque acts on any of the constituent elements. When the vehicle 3 is at a halt, as shown in the hydraulic circuit 71 in FIG. 7, the electric oil pump 70 is not in operation, and since no hydraulic pressure is supplied although the solenoid 174 of the solenoid valve 83 is deenergized, the hydraulic brakes 60A, 60B are released (OFF). Additionally, since the motors 2A, 2B are not driven, the one-way clutch 50 is left disengaged (OFF).

Figure 17:
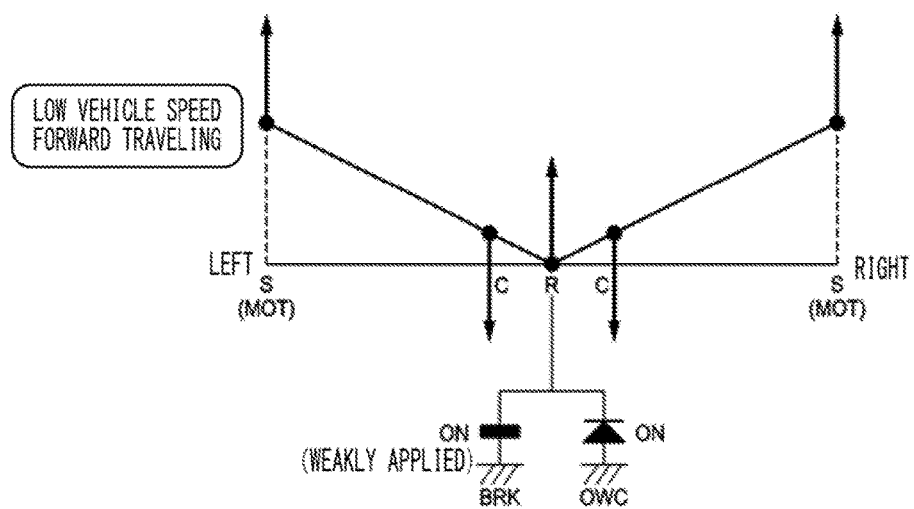
FIG. 17 is a speed collinear diagram of the rear wheel driving system while the vehicle is traveling forwards at low vehicle speeds.

Then, when the vehicle travels forwards at low vehicle speeds with good motor efficiency as in an EV start or an EV acceleration after an ignition switch is turned on, a rear wheel drive is executed by the rear wheel driving system 1. As shown in FIG. 17, when a power running drive is executed so that the motors 2A, 2B rotate in the forward direction, forward torque is applied to the sun gears 21A, 21B. As this occurs, the one-way clutch 50 is engaged and the ring gears 24A, 24B are locked, as has been described above. This causes the planetary carriers 23A, 23B to rotate in the forward direction, whereby the vehicle is caused to travel forwards. In addition, a running resistance is acting on the planetary carriers 23A, 23B in the reverse direction from the axle shafts 10A, 10B. When the vehicle 3 starts traveling forwards in this way, the ignition switch is turned on to increase the torque of the motors 2A, 2B, whereby the one-way clutch 50 is engaged mechanically, and the ring gears 24A, 24B are locked.

As this occurs, in the hydraulic circuit 71, as shown in FIG. 12, the electric oil pump 70 operates in the low pressure mode (Lo), the solenoid 174 of the solenoid valve 83 is left deenergized (OFF), and the hydraulic brakes 60A, 60B are weakly applied. In this way, when the forward rotational power of the motors 2A, 2B is inputted into the rear wheels Wr, the one-way clutch 50 is engaged, and the power can be transmitted only by the one-way clutch 50. However, the hydraulic brakes 60A, 60B that are provided parallel to the one-way clutch 50 are also applied weakly to keep the motors 2A, 2B and the rear wheels Wr side in contact with each other, whereby it is possible to restrict the occurrence of a risk of no power being transmitted between the motors 2A, 2B and the rear wheels Wr even though the one-way clutch 50 is disengaged as a result of the forward torque inputted from the motors 2A, 2B being reduced temporarily. In addition, it is not necessary to perform a rotation speed control which would otherwise be necessary to keep the motors 2A, 2B and the rear wheels Wr in contact with each other when the driving of the vehicle is shifted to a regenerative deceleration, which will be described later. The application force of the hydraulic brakes 60A, 60B then becomes weaker than those resulting when the vehicle is decelerated for regeneration or is reversed. Energy to be consumed to apply the hydraulic brakes 60A, 60B is reduced by making the application force of the hydraulic brakes 60A, 60B when the one-way clutch 50 is engaged weaker than the application force of the hydraulic brakes 60A, 60B when the one-way clutch 50 is disengaged. Further, in this state, too, as has been described above, the pressure of oil in the line oil path 75 is reduced at the orifice 85a by way of the first low pressure oil path 76a and the oil is then supplied to the lubricating and cooling portion 91, thereby effecting the lubrication and cooling of the constituent parts by the lubricating and cooling portion 91.

Figure 18:
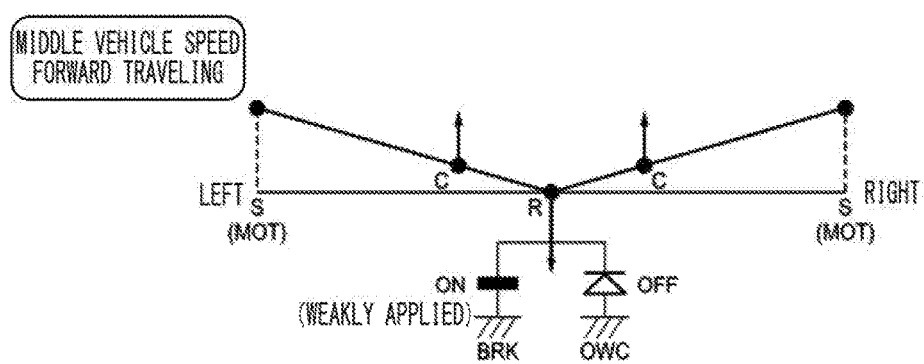
FIG. 18 is a speed collinear diagram of the rear wheel driving system while the vehicle is traveling forwards at middle vehicle speeds.

When the vehicle speed of the vehicle that is traveling forwards at low vehicle speeds is increased, causing the vehicle to travel forwards at middle vehicle speeds with good engine efficiency, the driving of the vehicle is shifted from the rear wheel driving by the rear wheel driving system 1 to the front wheel driving by the front wheel driving system 6. As shown in FIG. 18, when the motors 2A, 2B stop the power running drive, forward torque attempting to drive the vehicle forwards is applied to the planetary carriers 23A, 23B from the axle shafts 10A, 10B, respectively, and therefore, as described above, the one-way clutch 50 is disengaged.

As this occurs, in the hydraulic circuit 71, as shown in FIG. 12, the electric oil pump 70 operates in the low pressure mode (Lo), the solenoid 174 of the solenoid valve 83 is left deenergized (OFF), and the hydraulic brakes 60A, 60B are weakly applied. In this way, when the forward rotational power of the rear wheels Wr is inputted into the motors 2A, 2B, the one-way clutch 50 is disengaged, whereby the power cannot be transmitted only by the one-way clutch 50. However, the power can still be transmitted by causing the hydraulic brakes 60A, 60B which are provided parallel to the one-way clutch 50 to be applied weakly to thereby keep the motors 2A, 2B and the rear wheels Wr in contact with each other. This obviates the necessity of performing a rotation speed control when the driving of the vehicle is shifted to regenerative deceleration, which will be described later. It should be noted that the application force of the hydraulic brakes 60A, 60B then also becomes weaker than those resulting when the vehicle is decelerated for regeneration or is reversed. Further, in this state, as has been described above, the pressure of oil in the line oil path 75 is reduced at the orifice 85a by way of the first low pressure oil path 76a and the oil is then supplied to the lubricating and cooling portion 91, thereby effecting the lubrication and cooling of the constituent parts by the lubricating and cooling portion 91.

Figure 19:
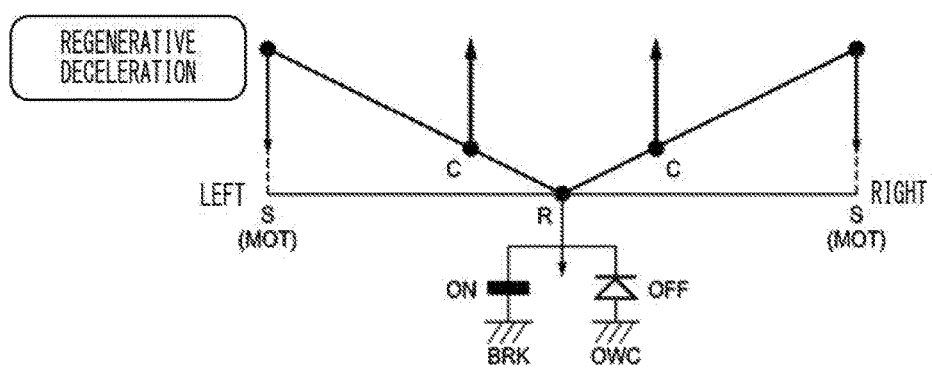
FIG. 19 is a speed collinear diagram of the rear wheel driving system while the vehicle is being decelerated for regeneration.

When attempting to drive the motors 2A, 2B for regeneration from the state shown in FIG. 17 or 18, as shown in FIG. 19, the forward torque attempting to keep the vehicle traveling forwards is applied to the planetary carriers 23A, 23B from the axle shafts 10A, 10B, and therefore, the one-way clutch 50 is disengaged as described above.

As this occurs, in the hydraulic circuit 71, as shown in FIG. 13, the electric oil pump 70 operates in the high pressure mode (Hi), the solenoid 174 of the solenoid valve 83 is left deenergized (OFF), and the hydraulic brakes 60A, 60B are applied (ON). Consequently, the ring gears 24A, 24B are fixed, and reverse regenerative braking torque is applied on the motors 2A, 2B, whereby a regenerative deceleration is executed by the motors 2A, 2B. In this way, when the forward rotational power of the rear wheels Wr is inputted into the motors 2A, 2B, the one-way clutch 50 is disengaged, and the power cannot be transmitted only by the one-way clutch 50. However, the power can still be transmitted by leaving the hydraulic brakes 60A, 60B which are provided in parallel to the one-way clutch 50 applied to keep the motors 2A, 2B and the rear wheels Wr in connection with each other, whereby the energy of the vehicle 3 can be recovered for regeneration by controlling the motors 2A, 2B to operate through regenerative drive. Further, in this state, as has been described above, the pressure of oil in the line oil path 75 is reduced at the orifice 85b by way of the second low pressure oil path 76b and the oil is then supplied to the lubricating and cooling portion 91, thereby effecting the lubrication and cooling of the constituent parts by the lubricating and cooling portion 91.

Following this, in accelerating the vehicle, both the front wheel driving system 6 and the rear wheel driving system 1 are actuated to run the vehicle 3 through four-wheel drive. In this state, the rear wheel driving system 1 is in the same state as the state shown in FIG. 17 where the vehicle 3 is traveling forwards at low vehicle speeds, and the hydraulic circuit 71 is in the state shown in FIG. 12.

Figure 20:
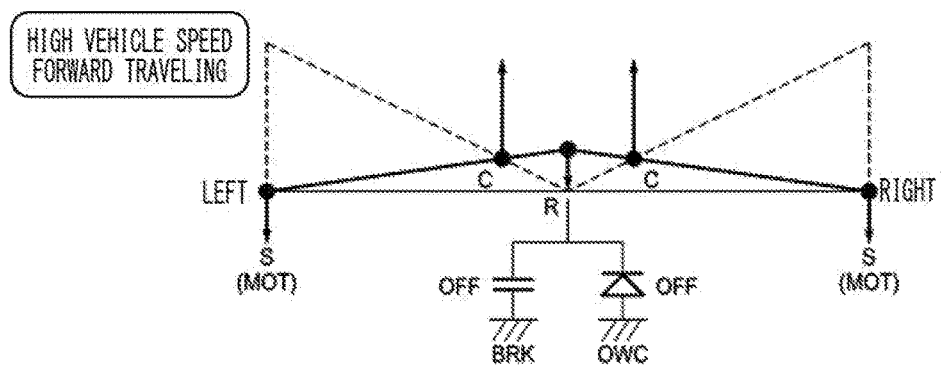
FIG. 20 is a speed collinear diagram of the rear wheel driving system while the vehicle is traveling forwards at high vehicle speeds.

In running the vehicle 3 forwards at high vehicle speeds, the front wheel driving system 6 functions to run the vehicle 3 through front-wheel drive. As shown in FIG. 20, when the motors 2A, 2B stop the power running drive, forward torque attempting to drive the vehicle forwards is applied to the planetary carriers 23A, 23B from the axle shafts 10A, 10B, respectively, and therefore, as described above, the one-way clutch 50 is disengaged.

As this occurs, in the hydraulic circuit 71, as shown in FIG. 11, the electric oil pump 70 operates in the low pressure mode (Lo), the solenoid 174 of the solenoid valve 83 is energized (ON), and the hydraulic brakes 60A, 60B are released (OFF). Consequently, the forced associated rotation of the motors 2A, 2B is prevented, whereby the over revolution of the motors 2A, 2B is prevented when the vehicle 3 is traveling forwards at high vehicle speeds using the front wheel driving system 6. Further, in this state, as has been described above, the pressure of oil in the line oil path 75 is reduced at the orifice 85a by way of the first low pressure oil path 76a and the oil is then supplied to the lubricating and cooling portion 91, thereby effecting the lubrication and cooling of the constituent parts by the lubricating and cooling portion 91.

Figure 21:
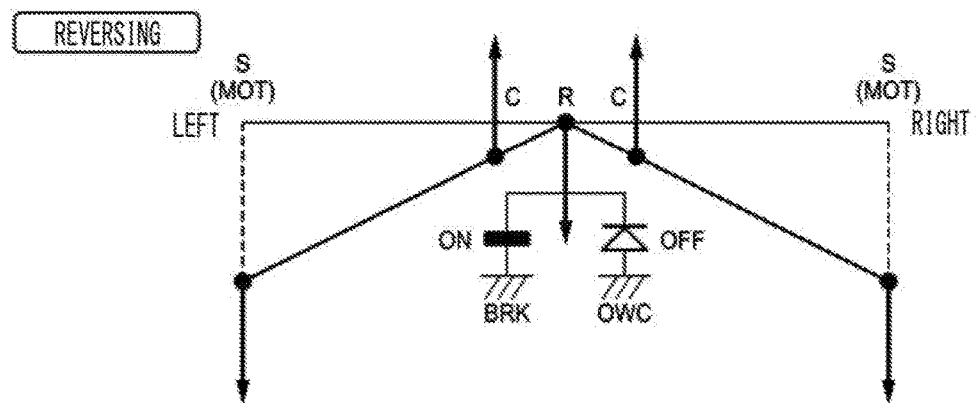
FIG. 21 is a speed collinear diagram of the rear wheel driving system while the vehicle is being reversed.

In reversing the vehicle, as shown in FIG. 21, when the motors 2A, 2B are operated through reverse power running drive, torque in the reverse direction is applied to the sun gears 21A, 21B. As this occurs, the one-way clutch 50 is disengaged as described above.

As this occurs, in the hydraulic circuit 71, as shown in FIG. 13, the electric oil pump 70 operates in the high pressure mode (Hi), the solenoid 174 of the solenoid valve 83 is left deenergized (OFF), and the hydraulic brakes 60A, 60B are applied. Consequently, the ring gears 24A, 24B are fixed, and the planetary carriers 23A, 23B are rotated in the reverse direction, whereby the vehicle is reversed. In this case, a running resistance is acting on the planetary carriers 23A, 23B in the forward direction from the axle shafts 10A, 10B. In this way, when the reverse rotational power of the motors 2A, 2B is inputted into the rear wheels Wr, the one-way clutch 50 is disengaged, and the power cannot be transmitted only by the one-way clutch 50. However, the power can still be transmitted by leaving the hydraulic brakes 60A, 60B which are provided in parallel to the one-way clutch 50 applied to keep the motors 2A, 2B and the rear wheels Wr in connection with each other, whereby the vehicle 3 can be reversed by virtue of the rotational power of the motors 2A, 2B. Further, in this state, as has been described above, the pressure of oil in the line oil path 75 is reduced at the orifice 85b by way of the second low pressure oil path 76b and the oil is then supplied to the lubricating and cooling portion 91, thereby effecting the lubrication and cooling of the constituent parts by the lubricating and cooling portion 91.

In this way, in the rear wheel driving system 1, the hydraulic brakes 60A, 60B are controlled to be applied or released according to the running states of the vehicle 3, in other words, whether the motors 2A, 2B rotate in the forward direction or the reverse direction and whether the power is inputted from the motors 2A, 2B side or the rear wheels Wr side, and the application force is adjusted even when the hydraulic brakes 60A, 60B are being applied.

Figure 22:
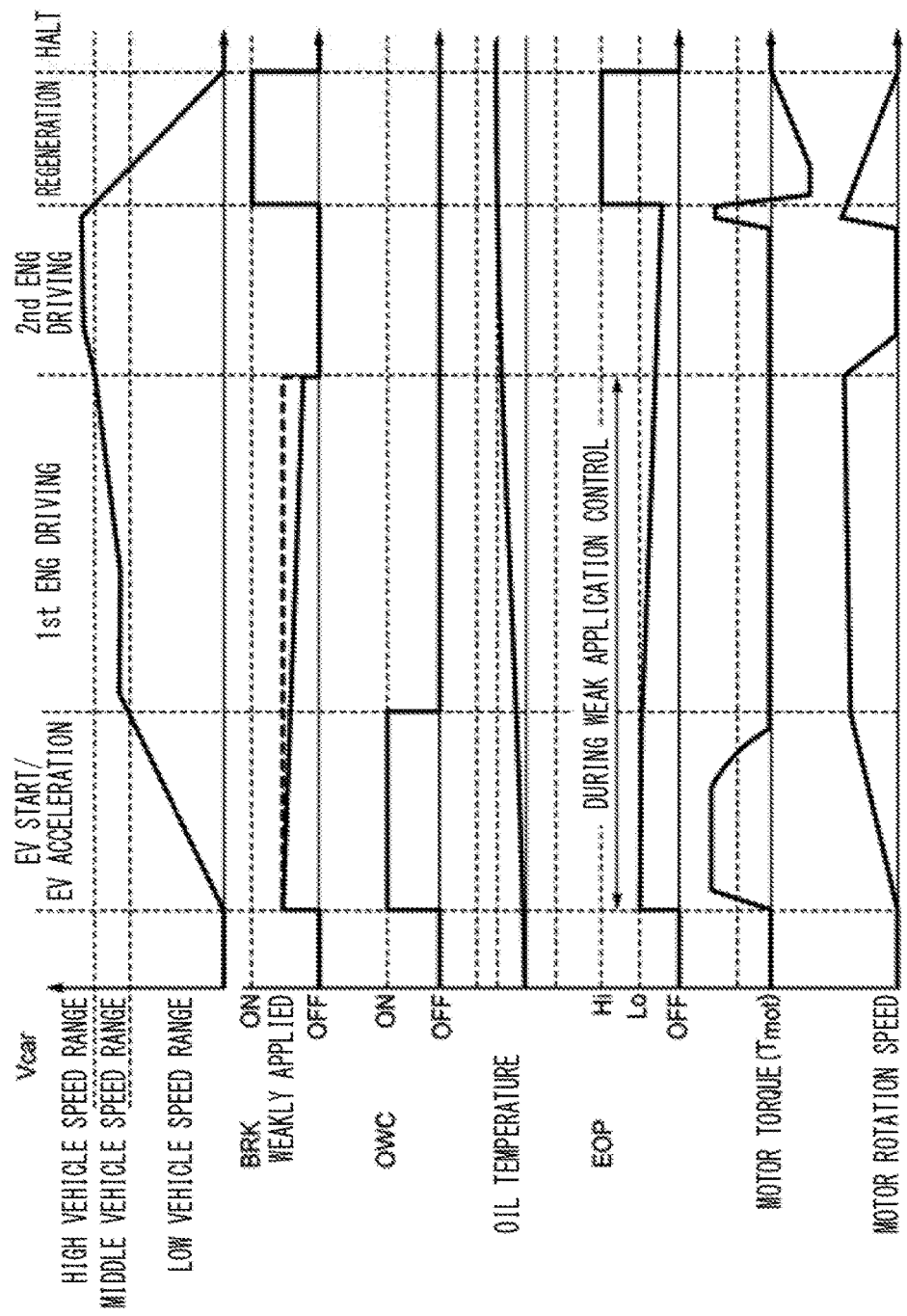
FIG. 22 is a timing chart in an example of a running of the vehicle which shows a control of an application force of the hydraulic brakes which are being applied.

FIG. 22 is a timing chart of the electric oil pump 70 (EOP), the one way clutch 50 (OWC) and the hydraulic brakes 60A, 60B (BRK) when the vehicle 3 performs from a halt state a series of actions of EV start→EV acceleration→first engine driving (ENG driving)→second engine driving (ENG driving)→regenerative deceleration→halt. In addition, in FIG. 22, oil temperatures that are detected by the sensor 92, torque of the motors 2A, 2B (motor torque) and rotation speed of the motors 2A, 2B (motor rotation speed) are shown.

Firstly, the electric oil pump 70 is kept inoperable, the one-way clutch 50 is kept disengaged (OFF) and the hydraulic brakes 60A, 60B are kept released (OFF) until the ignition switch is turned on, a shift lever is shifted from a P range to a D range, and an accelerator pedal is depressed. When the accelerator pedal is depressed from that state, the rear wheel driving system 1 is actuated to perform the EV start and the EV acceleration through rear wheel driving. As this occurs, the electric oil pump 70 operates in the low pressure mode (Lo), the one-way clutch 50 is engaged (ON), and the hydraulic brakes 60A, 60B are weakly applied.

Then, when the driving of the vehicle is shifted from the rear wheel driving to the front wheel driving as a result of the vehicle speed reaching the middle vehicle speed range from the low vehicle speed range, the vehicle is driven through the first engine driving by the internal combustion engine 4. As this occurs, the one-way clutch 50 is disengaged (OFF), the electric oil pump 70 operates in the low pressure mode (Lo), and the hydraulic brakes 60A, 60B are kept weakly applied. Then, when the vehicle speed reaches the high vehicle speed range from the middle vehicle speed range, the hydraulic brakes 60A, 60B are released while the one-way clutch 50 is kept disengaged (OFF) and the electric oil pump 70 is kept operating in the low pressure mode (Lo), whereby the vehicle is driven through the second engine driving. Then, when the brake pedal is depressed, for example, to decelerate the vehicle for regeneration, the electric oil pump 70 operates in the high pressure mode (Hi) and the hydraulic brakes 60A. 60B are applied (ON) while the one-way clutch 50 is kept disengaged (OFF). Then, when the vehicle 3 comes to a halt, the electric oil pump 70 stops its operation (OFF), the one-way clutch 50 is disengaged (OFF), and the hydraulic brakes 60A. 60B are released (OFF).

An oil temperature detected by the sensor 92 changes with time while the vehicle performs the series of driving events. This is because the oil temperature changes due to heat generated by the motors 2A, 2B, heat generated when the oil is stirred, and heat generated in association with torque transmission loss that is generated when the torque of the motors 2A, 2B is transmitted to the planetary gear type speed reducers 12A, 12B. It is seen that the application force necessary to apply the hydraulic brakes 60A, 60B weakly also changes with time to become low gradually as the oil temperature rises. The application force necessary to apply the hydraulic brakes 60A, 60B weakly needs to be greater than a sum of a force with which the motors 2A, 2B are forced to rotate together and a resisting force of oil that is stirred by the motors 2A, 2B and the planetary gear type speed reducers 12A, 12B.

The resisting force of the stirred oil changes according to the viscosity of the oil. It is known that an inverse correlation exists between the viscosity of oil and temperature (oil temperature). Thus, viscosity decreases as oil temperature increases, while viscosity increases as oil temperature decreases.

Consequently, while the vehicle performs the series of driving events shown in FIG. 22, the application force of the hydraulic brakes 60A, 60B that are being applied is controlled to be weakened as the temperature of the oil increases according to the oil temperature detected by the sensor 92. By doing so, the reliability of the hydraulic brakes 60A, 60B can be ensured by holding the application force thereof while the oil temperature remains low, whereas when the oil temperature rises, the application force is mitigated thereby making it possible to suppress an increase in consumed energy that would otherwise be caused by an excessive application force. The control described above may be executed not only while the hydraulic brakes 60A, 60B are being applied weakly but also while the hydraulic brakes 60A, 60B are being applied as in the case where regenerative deceleration is carried out as shown in FIG. 22.

In this way, the hydraulic brakes 60A, 60B functioning as the power transmission devices are configured so that the application force can be changed, whereby the power transmission capacity of the power transmission path can be changed.

In the above description, when the vehicle is decelerated so that the energy thereof is recovered for regeneration, the operating state of the electric oil pump 70 is switched from the low pressure mode (Lo) to the high pressure mode (Hi), so that the application force of the hydraulic brakes 60A, 60B is increased from the application force with which the hydraulic brakes 60A, 60B are applied weakly to the application force with which the hydraulic brakes 60A, 60B are applied normally. As described in the first embodiment, however, in the zone P3 in FIG. 2B, even though the current application force is less than the necessary application force Fmax with which the maximum motor torque Tmax that the motors 2A, 2B can generate according to their sizes can be transmitted, since the current application force, which is an application force that the hydraulic brakes 60A, 60B is currently exerting, is greater than the necessary application force F resulting when the maximum torque T of the motors 2A. 2B that is based on the current motor rotation speed at the current vehicle speed V is generated, all the torque can theoretically be transmitted between the motors 2A, 2B and the rear wheels Wr.

Consequently, when the vehicle runs in the way shown in FIG. 22, in a case where the current application force of the hydraulic brakes 60A, 60B is greater than the necessary application force F resulting when the maximum torque T of the motors 2A, 2B that is based on the current motor rotation speed (the vehicle speed V) is generated in the series of driving events of EV start→EV acceleration→the first engine driving (the ENG driving), that is, while the hydraulic brakes 60A, 60B are being applied weakly, the vehicle can be decelerated for regeneration by driving the motors 2A, 2B for regeneration with the hydraulic brakes 60A, 60B kept applied weakly.

Specifically speaking, when a request is made for a regenerative drive of the motors 2A, 2B, the controller 8 acquires current motor rotation speeds from the resolvers 20A. 20B and acquires a current application force of the clutch CL from the sensor 92. Then, the controller 8 compares the necessary application force F resulting when the maximum torque T that is based on the current motor rotation speeds of the motors 2A. 2B (the vehicle speed V) is generated with the current application force. Then, in a case the current application force is equal to or greater than the necessary application force F, the controller 8 permits the motor 102 to be driven for regeneration without changing the application force of the clutch CL.

In a case where the motor rotation speed (the vehicle speed V) is reduced by a braking force obtained by driving the motor 102 for regeneration whereby the zone P2 in FIG. 2B is reached, the motors 2A, 2B are caused to stop performing the regenerative drive, and wheel brakes are activated, thereby making it possible to obtain a necessary braking force.

When the current application force of the clutch CL is less than the necessary application force F, the controller 8 prohibits the motors 2A, 2B from performing the regenerative drive under the current application force. Then, as described in relation to FIGS. 13 and 19, the controller 8 should operate the electric oil pump 70 in the high pressure mode (Hi), deenergize the solenoid 174 of the solenoid valve 83 (OFF) and apply the hydraulic brakes 60A, 60B (ON) to thereby permit the motors 2A, 2B to perform the regenerative drive.

In this embodiment, the controller 8 controls to permit and/or prohibit the motor 102 from performing the regenerative drive based on the necessary application force F and the current application force. However, a configuration may be adopted in which the controller 8 acquires a maximum torque T of the motors 2A, 2B at the current motor rotation speeds that are acquired from the resolvers 20A. 20B and acquires a transmission allowable power that is permitted to be transmitted by the current application force of the hydraulic brakes 60A, 60B that is acquired from the sensor 92 and controls to permit and/or prohibit the motors 2A, 2B from performing the regenerative drive based on the maximum torque T and the transmission allowable power. Then, in a case the transmission allowable power is smaller than the maximum torque T, the controller 8 prohibits the motors 2A, 2B from performing the regenerative drive, whereas in a case the transmission allowable power is equal to or greater than the maximum torque T, the controller 8 permits the motors 2A, 2B to generate power without changing the application force of the hydraulic brakes 60A, 60B.

Thus, as has been described heretofore, in this embodiment, too, the controller 8 controls to permit and/or prohibit the motors 2A, 2B from generating power in consideration of the current rotating state quantities of the motors 2A, 2B, thereby making it possible to expand the range over which the motors are used while suppressing the consumed energy. Thus, the controller 8 can expand the range over which the motors 2A, 2B are used wider while suppressing the consumed energy than when the conventional technique is used.

The invention is not limited to the embodiment that has been described heretofore and hence can be modified or improved as required.

The configuration of the invention is not limited specifically as long as the invention includes a motor, wheels, and a power transmission device such as a clutch and a brake which is provided on a power transmission path between the motor and the wheels.

For example, in the second embodiment, the ring gears 24A, 24B do not have to be provided with the hydraulic brakes 60A. 60B, respectively, and hence, at least one hydraulic brake should be provided on the ring gears 24A, 24B which are connected together, and the one-way clutch 50 does not necessarily have to be provided.

This patent application is based on Japanese Patent Application (No. 2016-067853) filed on Mar. 30, 2016, the contents of which are incorporated herein by reference.

DESCRIPTION OF REFERENCE NUMERALS AND CHARACTERS

1 Rear wheel driving system
2A, 2B, 102 Motor
8 controller (Motor controller, Application force controller)
60A, 60B Hydraulic brake (power transmission device)
92 Sensor (Application force acquiring device)
100 Driving system
104 Application force acquiring device
108a Motor controller
108b Application force controller
CL Clutch (power transmission device)
LWr, RWr Rear wheel (wheel)
W Wheel

The invention claimed is:

1. A driving system comprising:
a motor that is connected to a wheel of a vehicle so as to transmit power to the wheel;
a power transmission device that is provided on a power transmission path between the motor and the wheel and that can change a power transmission capacity of the power transmission path by controlling an application force;
a motor controller that controls power that is generated by the motor; and
an application force controller that controls the application force of the power transmission device,
wherein the driving system further comprises an application force acquiring device that acquires a current application force which is an application force that the power transmission device is currently exerting, and
wherein when the motor controller receives a request for generation of power in such a state that the motor generates no power, the motor controller controls to permit or prohibit the generation of power of the motor based on the current application force and a necessary application force which is an application force of the power transmission device that is needed to transmit a maximum generation power of the motor in a current rotating state quantity which is a rotating state quantity that the motor is currently having.

2. The driving system according to claim 1,
wherein when the current application force is smaller than the necessary application force, the generation of power of the motor is prohibited.

3. A driving system comprising:
a motor that is connected to a wheel of a vehicle so as to transmit power to the wheel;
a power transmission device that is provided on a power transmission path between the motor and the wheel and that can change a power transmission capacity of the power transmission path by controlling an application force;
a motor controller that controls power that is generated by the motor; and
an application force controller that controls the application force of the power transmission device,
wherein the driving system further comprises an application force acquiring device that acquires a current application force which is an application force that the power transmission device is currently exerting, and
wherein when the motor controller receives a request for an increase in power in such a state that the motor is generating power, the motor controller controls to permit or prohibit the increase in power of the motor based on the current application force and a necessary application force which is an application force of the power transmission device that is needed to transmit a maximum generation power of the motor in a current rotating state quantity which is a rotating state quantity that the motor is currently having.

4. The driving system according to claim 3,
wherein when the current application force is smaller than the necessary application force, the increase in power of the motor is prohibited.

5. A driving system comprising:
a motor that is connected to a wheel of a vehicle so as to transmit power to the wheel;
a power transmission device that is provided on a power transmission path between the motor and the wheel and that can change a power transmission capacity of the power transmission path by controlling an application force;
a motor controller that controls power that is generated by the motor; and
an application force controller that controls the application force of the power transmission device,
wherein the driving system further comprises an application force acquiring device that acquires a current application force which is an application force that the power transmission device is currently exerting, and wherein when the motor controller receives a request for generation of power in such a state that the motor generates no power, the motor controller controls to permit or prohibit the generation of power of the motor based on a maximum generation power of the motor in a current rotating state quantity which is a rotating state quantity that the motor is currently having and a transmission allowable power which is an allowable power that the power transmission device can transmit in the current application force.

6. The driving system according to claim 5, wherein when the transmission allowable power is smaller than the maximum generation power, the generation of power of the motor is prohibited.

7. A driving system comprising:

a motor that is connected to a wheel of a vehicle so as to transmit power to the wheel;

a power transmission device that is provided on a power transmission path between the motor and the wheel and that can change a power transmission capacity of the power transmission path by controlling an application force;

a motor controller that controls power that is generated by the motor; and an application force controller that controls the application force of the power transmission device, wherein the driving system further comprises an application force acquiring device that acquires a current application force which is an application force that the power transmission device is currently exerting, and wherein when the motor controller receives a request for an increase in power in such a state that the motor is generating power, the motor controller controls to permit or prohibit the increase in power of the motor based on a maximum generation power of the motor in a current rotating state quantity which is a rotating state quantity that the motor is currently having and a transmission allowable power which is an allowable power that the power transmission device can transmit in the current application force.

8. The driving system according to claim 7, wherein when the transmission allowable power is smaller than the maximum generation power, the increase in power is prohibited.

* * * * *